US008700294B2

(12) United States Patent
Downs et al.

(10) Patent No.: US 8,700,294 B2
(45) Date of Patent: Apr. 15, 2014

(54) REPRESENTATIVE ROAD TRAFFIC FLOW INFORMATION BASED ON HISTORICAL DATA

(75) Inventors: Oliver B. Downs, Redmond, WA (US); Jesse S. Hersch, Bellevue, WA (US); Craig H. Chapman, Redmond, WA (US)

(73) Assignee: Inrix, Inc., Kirkland, WA (US)

( * ) Notice: Subject to any disclaimer, the term of this patent is extended or adjusted under 35 U.S.C. 154(b) by 827 days.

(21) Appl. No.: 12/377,592

(22) PCT Filed: Aug. 16, 2007

(86) PCT No.: PCT/US2007/018389

§ 371 (c)(1), (2), (4) Date: Nov. 9, 2010

(87) PCT Pub. No.: WO2008/021551

PCT Pub. Date: Feb. 21, 2008

(65) Prior Publication Data

US 2011/0202266 A1 Aug. 18, 2011

Related U.S. Application Data

(63) Continuation of application No. 11/835,357, filed on Aug. 7, 2007, now Pat. No. 7,908,076.

(60) Provisional application No. 60/838,761, filed on Aug. 18, 2006.

(51) Int. Cl.

| | |
|---|---|
| ***G08G 1/00*** | (2006.01) |
| ***G06G 7/76*** | (2006.01) |
| *G01C 21/26* | (2006.01) |
| *G08G 1/127* | (2006.01) |

(52) U.S. Cl.
USPC ............................ 701/117; 701/118; 701/119

(58) Field of Classification Search
USPC ..................... 340/905, 934, 995.13; 348/149; 701/117–119, 414, 423
See application file for complete search history.

(56) References Cited

U.S. PATENT DOCUMENTS

| | | | | |
|---|---|---|---|---|
| 3,582,620 | A | 6/1971 | Noetinger | 235/150.24 |
| 3,626,413 | A | 12/1971 | Zachmann | 343/8 |

(Continued)

FOREIGN PATENT DOCUMENTS

| | | |
|---|---|---|
| DE | 199 28 082 | 12/2000 |
| DE | 100 63 763 | 7/2002 |

(Continued)

OTHER PUBLICATIONS

U.S. Appl. No. 60/628,267, filed Nov. 16, 2004, Horvitz.

(Continued)

*Primary Examiner* — Khoi Tran
*Assistant Examiner* — Dale Moyer
(74) *Attorney, Agent, or Firm* — Seed IP Law Group PLLC

(57) ABSTRACT

Techniques are described for automatically analyzing historical information about road traffic flow in order to generate representative information regarding current or future road traffic flow, and for using such generated representative traffic flow information. Representative traffic flow information may be generated for a variety of types of useful measures of traffic flow, such as for average speed at each of multiple road locations during each of multiple time periods. Generated representative traffic flow information may be used in various ways to assist in travel and for other purposes, such as to determine likely travel times and plan optimal routes. The historical traffic data used to generate the representative traffic flow information may include data readings from physical sensors that are near or embedded in the roads, and/or data samples from vehicles and other mobile data sources traveling on the roads.

72 Claims, 5 Drawing Sheets

(56) References Cited

U.S. PATENT DOCUMENTS

| | | | | |
|---|---|---|---|---|
| 4,866,438 | A | 9/1989 | Knisch | 340/936 |
| 4,985,705 | A | 1/1991 | Stammler | 342/69 |
| 5,289,183 | A | 2/1994 | Hassett et al. | 340/905 |
| 5,337,082 | A | 8/1994 | Fredericks | 342/69 |
| 5,465,289 | A | 11/1995 | Kennedy, Jr. | 379/59 |
| 5,590,217 | A | 12/1996 | Toyama | 382/104 |
| 5,610,821 | A | 3/1997 | Gazis et al. | 364/444.2 |
| 5,663,720 | A | 9/1997 | Weissman | 340/934 |
| 5,673,039 | A | 9/1997 | Pietzsch et al. | |
| 5,696,502 | A | 12/1997 | Busch et al. | 340/905 |
| 5,745,865 | A | 4/1998 | Rostoker et al. | 701/117 |
| 5,822,712 | A * | 10/1998 | Olsson | 701/117 |
| 5,827,712 | A | 10/1998 | Yokoyama et al. | 435/193 |
| 6,011,515 | A | 1/2000 | Radcliffe et al. | 342/453 |
| 6,119,013 | A | 9/2000 | Maloney et al. | 455/456 |
| 6,150,961 | A | 11/2000 | Alewine et al. | 340/995 |
| 6,292,742 | B1 | 9/2001 | Heimann et al. | 701/117 |
| 6,317,686 | B1 * | 11/2001 | Ran | 701/533 |
| 6,401,027 | B1 | 6/2002 | Xu et al. | 701/117 |
| 6,463,382 | B1 | 10/2002 | Bullock | 701/117 |
| 6,480,783 | B1 | 11/2002 | Myr | 701/117 |
| 6,490,519 | B1 | 12/2002 | Lapidot et al. | 701/117 |
| 6,496,773 | B1 | 12/2002 | Olsson | 701/117 |
| 6,505,114 | B2 | 1/2003 | Luciani | 701/117 |
| 6,574,548 | B2 | 6/2003 | DeKock et al. | 701/117 |
| 6,587,781 | B2 | 7/2003 | Feldman et al. | 701/117 |
| 6,594,576 | B2 | 7/2003 | Fan et al. | 701/117 |
| 6,650,948 | B1 | 11/2003 | Atkinson et al. | 700/66 |
| 6,664,922 | B1 | 12/2003 | Fan | 342/357.1 |
| 6,728,628 | B2 | 4/2004 | Peterson | 701/117 |
| 6,781,523 | B2 | 8/2004 | Matsui et al. | 340/910 |
| 6,832,140 | B2 | 12/2004 | Fan et al. | 701/33 |
| 6,842,620 | B2 | 1/2005 | Smith et al. | 455/456 |
| 6,862,524 | B1 | 3/2005 | Nagda et al. | 701/209 |
| 6,882,313 | B1 | 4/2005 | Fan et al. | 342/457 |
| 6,882,930 | B2 | 4/2005 | Trayford et al. | 701/117 |
| 6,922,566 | B2 | 7/2005 | Puranik et al. | 455/456.2 |
| 6,973,319 | B2 | 12/2005 | Ormson | 455/456.1 |
| 6,989,765 | B2 | 1/2006 | Gueziec | |
| 7,026,958 | B2 | 4/2006 | Wainfan et al. | 340/995.13 |
| 7,027,915 | B2 | 4/2006 | Craine | 701/117 |
| 7,069,143 | B2 | 6/2006 | Peterson | 701/117 |
| 7,096,115 | B1 | 8/2006 | Groth et al. | 701/117 |
| 7,116,326 | B2 | 10/2006 | Soulchin et al. | 345/440 |
| 7,161,497 | B2 | 1/2007 | Gueziec | |
| 7,221,287 | B2 | 5/2007 | Gueziec et al. | |
| 7,363,144 | B2 | 4/2008 | Liu et al. | 701/117 |
| 7,375,649 | B2 | 5/2008 | Gueziec | |
| 7,508,321 | B2 | 3/2009 | Gueziec et al. | |
| 7,519,564 | B2 | 4/2009 | Horvitz | |
| 7,557,730 | B2 | 7/2009 | Gueziec | |
| 7,610,145 | B2 | 10/2009 | Kantarjiev et al. | |
| 2001/0027373 | A1 | 10/2001 | Bates et al. | 701/117 |
| 2001/0047241 | A1 | 11/2001 | Khavakh et al. | |
| 2002/0051464 | A1 | 5/2002 | Sin et al. | |
| 2003/0028319 | A1 | 2/2003 | Khavakh et al. | |
| 2003/0069683 | A1 | 4/2003 | Lapidot et al. | |
| 2004/0034467 | A1 | 2/2004 | Sampedro et al. | 701/201 |
| 2004/0039520 | A1 | 2/2004 | Khavakh et al. | |
| 2004/0249568 | A1 | 12/2004 | Endo et al. | 701/209 |
| 2004/0267440 | A1 | 12/2004 | DeKock et al. | |
| 2005/0093720 | A1 * | 5/2005 | Yamane et al. | 340/995.13 |
| 2005/0140525 | A1 | 6/2005 | Tomita et al. | 340/995.13 |
| 2005/0206534 | A1 | 9/2005 | Yamane et al. | 340/994 |
| 2006/0025925 | A1 | 2/2006 | Fushiki et al. | 701/210 |
| 2006/0041927 | A1 | 2/2006 | Stark et al. | |
| 2006/0074551 | A1 | 4/2006 | Zaitsu et al. | |
| 2006/0089787 | A1 * | 4/2006 | Burr et al. | 701/202 |
| 2006/0103674 | A1 | 5/2006 | Horvitz et al. | 345/629 |
| 2006/0106530 | A1 | 5/2006 | Horvitz et al. | 701/117 |
| 2006/0106599 | A1 | 5/2006 | Horvitz | 704/219 |
| 2006/0106743 | A1 | 5/2006 | Horvitz | 706/21 |
| 2006/0122846 | A1 | 6/2006 | Burr et al. | |
| 2006/0149461 | A1 | 7/2006 | Rowley et al. | 701/202 |
| 2006/0155464 | A1 | 7/2006 | Smartt | 701/208 |
| 2006/0158330 | A1 * | 7/2006 | Gueziec | 340/539.13 |
| 2006/0224797 | A1 | 10/2006 | Parish et al. | |
| 2006/0229802 | A1 | 10/2006 | Vertelney et al. | 701/200 |
| 2007/0005419 | A1 | 1/2007 | Horvitz et al. | |
| 2007/0073477 | A1 | 3/2007 | Krumm et al. | |
| 2007/0199050 | A1 | 8/2007 | Meier | |
| 2007/0208492 | A1 | 9/2007 | Downs et al. | |
| 2007/0208494 | A1 | 9/2007 | Chapman et al. | |
| 2007/0208495 | A1 | 9/2007 | Chapman et al. | |
| 2007/0208496 | A1 | 9/2007 | Downs et al. | |
| 2007/0208497 | A1 | 9/2007 | Downs et al. | |
| 2007/0208498 | A1 | 9/2007 | Barker et al. | |
| 2007/0208501 | A1 | 9/2007 | Downs et al. | |
| 2008/0021791 | A1 | 1/2008 | Steelberg et al. | |
| 2008/0046165 | A1 | 2/2008 | Downs et al. | |
| 2008/0059115 | A1 | 3/2008 | Wilkinson | |
| 2008/0071465 | A1 | 3/2008 | Chapman et al. | |
| 2008/0071466 | A1 | 3/2008 | Downs et al. | 701/117 |
| 2008/0133517 | A1 | 6/2008 | Kapoor et al. | |
| 2008/0275309 | A1 | 11/2008 | Stivoric et al. | |
| 2008/0278328 | A1 | 11/2008 | Chand et al. | |
| 2009/0118996 | A1 | 5/2009 | Kantarjiev et al. | |

FOREIGN PATENT DOCUMENTS

| | | | |
|---|---|---|---|
| DE | 103 36 590 | | 2/2005 |
| JP | 200690872 | A | 4/2006 |
| WO | 2004/021305 | | 3/2004 |
| WO | 2004/021306 | | 3/2004 |
| WO | 2006/005906 | | 1/2006 |

OTHER PUBLICATIONS

"Dash Express Automotive Navigation System," retrieved Aug. 3, 2007, from http://www.dash.net/product.php, 1 page.

"Dash Navigation Unveils First Internet-Connected Auto Navigation Device," Sep. 26, 2006, Dash Navigation™, Inc., retrieved Aug. 3, 2007, from http://www.dash.net/news_pr-060925.php, 1 page.

"Inrix Advances Navigation with 'Nationwide Average Speeds'," Aug. 7, 2006, Inrix, Inc., retrieved Jul. 19, 2007, from http://www.inrix.com/news_NationwideAverageSpeeds_07Aug2006.asp, 1 page.

"Inrix Historical Traffic Improves Consumer Navigation Experience," Jul. 18, 2007, Inrix, Inc., retrieved Jul. 19, 2007, from http://www.inrix.com/news_NAS_18July2007.asp, 2 pages.

"LandSonar, Inc. Announces First-Ever Nationwide Traffic-Prediction Product," Jan. 22, 2006, LandSonar, Inc., retrieved Jul. 20, 2007, from http://www.landsonar.com/?p=55, 3 pages.

"NAVTEQ Launches NAVTEQ Traffic Patterns™ Database: *Historic Traffic Data is the Basis for Predicting Traffic Behavior and Enhancing Routes*," Jan. 5, 2007, NAVTEQ, retrieved Jul. 19, 2007, from http://www.navteq.com/webapps/NewsUserServlet?action=NewsDetail&newsId=479, 2 pages.

"TrafficCast International and LandSonar Introduce LPS Plus," Mar. 1, 2007, LandSonar, Inc., retrieved Jul. 19, 2007, from http://www.landsonar.com/?p=117, 2 pages.

"About LandSonar, Inc.," retrieved Apr. 27, 2006, from http://www.landsonar.com/?page_id=2, 2 pages.

"Award Abstract—#0349460—SBIR Phase II: Animated Real-Time Road Traffic Visualization for Broadcast and the Internet," National Science Foundation, retrieved Jul. 31, 2006, from http://www.nsf.gov/awardsearch/showAward.do?AwardNumber=0349460, 2 pages.

"Global Positioning Systems > Tracking Systems in the Yahoo! Directory," Yahoo!® Small Business Directory, retrieved Feb. 8, 2006, from http://dir.yahoo.com/Business_and_Economy/Business_to_Business/Navigation/Global_Positioning_Systems/Tracking_Systems, 8 pages.

"IntelliOne Launches Need4Speed, Two-Week Road Test of Groundbreaking Live Traffic Measurement and Reporting Technology," www.IntelliOne.com, Aug. 1, 2006, 2 pages.

"Powerful Tool Crunches Commutes," Mar. 8, 2005, National Science Foundation, retrieved Jan. 20, 2006, from http://www.beatthetraffic.com/aboutus/nsf20050308.htm, 2 pages.

"Seattle Area Traffic—Central Puget Sound Travel Times," Washington State Department of Transportation, retrieved Jan. 20, 2006, from http://www.wsdot.wa.gov/traffic/seattle/traveltimes/, 3 pages.

(56) References Cited

OTHER PUBLICATIONS

"Technology Overview," retrieved Apr. 27, 2006, from http://www.landsonar.com/?page_id=20, 3 pages.
BeatTheTraffic.com: The Right Traffic at the Right Time™, Homepage, retrieved Jan. 20, 2006, from http://www.beatthetraffic.com/, 1 page.
Bluestein, G., "Traffic Jam? 2 Atlanta Companies Say Look to Your Cell Phone," The Mercury News, Nov. 5, 2006, downloaded Nov. 6, 2006, from http://www.mercury news.com/mld/mercurynews/news/breaking_news/15937597.htm, 2 pages.
Graham-Rowe, D., "Smart Traffic Forecast Offers Seven-Day Predictions," Jun. 29, 2005, NewScientist.com, retrieved Jan. 20, 2006, from http://www.newscientist.com/article.ns?id=dn7605&print=true, 2 pages.
Green, D., "Navigating by Phone," Apr. 28, 2004, Palo Alto Weekly Online Edition, retrieved Jul. 27, 2006, from http://www.paloaltoonline.com/weekly/morgue/2004/2004_04_28.zipdash28ja.shtml, 3 pages.
Slawski, W., "Ending Gridlock with Google Driving Assistance (Zipdash Re-Emerges)," Jul. 6, 2006, retrieved Jul. 27, 2006, from http://www.seobythesea.com/?p=240, 3 pages.
Smith, B. "OmniTRACS Keeps on Trucking," Dec. 1, 2005, WirelessWeek.com, retrieved Feb. 7, 2006, from http://www.wirelessweek.com/index.asp?layout=articlePrint&articleID=CA6287997, 2 pages.
Utter, D., "Google Mobilizes Traffic Data," Jul. 25, 2006, webpronews.com, retrieved Jul. 27, 2006, from http://www.webpronews.com/topnews/topnews/wpn-60-20060725GoogleMobilizesTrafficData.html, 4 pages.

* cited by examiner

REPRESENTATIVE ROAD TRAFFIC FLOW INFORMATION BASED ON HISTORICAL DATA

TECHNICAL FIELD

The following disclosure relates generally to techniques for analyzing historical information about road traffic flow in order to generate representative information regarding future road traffic flow, such as for use in improving future travel over roads in one or more geographic areas.

BACKGROUND

As road traffic has continued to increase at rates greater than increases in road capacity, the effects of increasing traffic congestion have had growing deleterious effects on business and government operations and on personal well-being. Accordingly, efforts have been made to combat the increasing traffic congestion in various ways, such as by obtaining information about current traffic conditions and providing the information to individuals and organizations. Such current traffic condition information may be provided to interested parties in various ways (e.g., via frequent radio broadcasts, an Internet Web site that displays a map of a geographical area with color-coded information about current traffic congestion on some major roads in the geographical area, information sent to cellular telephones and other portable consumer devices, etc.).

One source for obtaining information about current traffic conditions includes observations supplied by humans (e.g., traffic helicopters that provide general information about traffic flow and accidents, reports from drivers via cellphones, etc.), while another source in some larger metropolitan areas is networks of traffic sensors capable of measuring traffic flow for various roads in the area (e.g., via sensors embedded in the road pavement). While human-supplied observations may provide some value in limited situations, such information is typically limited to only a few areas at a time and typically lacks sufficient detail to be of significant use. While traffic sensor networks can provide more detailed information about recent traffic conditions on some roads in some situations, various problems exist with respect to such information, as well as to information provided by other similar sources. For example, many roads do not have road sensors (e.g., geographic areas that do not have networks of road sensors and/or arterial roads that are not sufficiently large to have road sensors as part of a nearby network), and even roads that have road sensors may often not provide accurate data (e.g., sensors that are broken and do not provide any data or provide inaccurate data). Moreover, if information from such a road traffic network is not available in a timely manner (e.g., due to temporary transmission problems and/or inherent delays in providing road traffic network information), the value of such information is greatly diminished. Furthermore, some traffic-related information may be available only in raw and/or disaggregated form, and therefore may be of limited utility.

Thus, it is often difficult or impossible to obtain current and accurate information about road traffic conditions on roads of interest. Moreover, even if such current accurate road traffic conditions information is available, that information has only limited value in projecting what road traffic conditions will be like at a later time (e.g., 3 hours in the future, a week in the future, etc.), which may be of interest in various situations (e.g., to a person planning a later trip or beginning a trip now that will reach roads of interest at some point in the future, to a person coordinating multiple vehicles traveling over the roads at various times, etc.). For example, a multi-car accident that has currently halted traffic flow on a particular road may have little effect on traffic flow on that road later in the day or at the same time next week.

DETAILED DESCRIPTION

Figure 1:
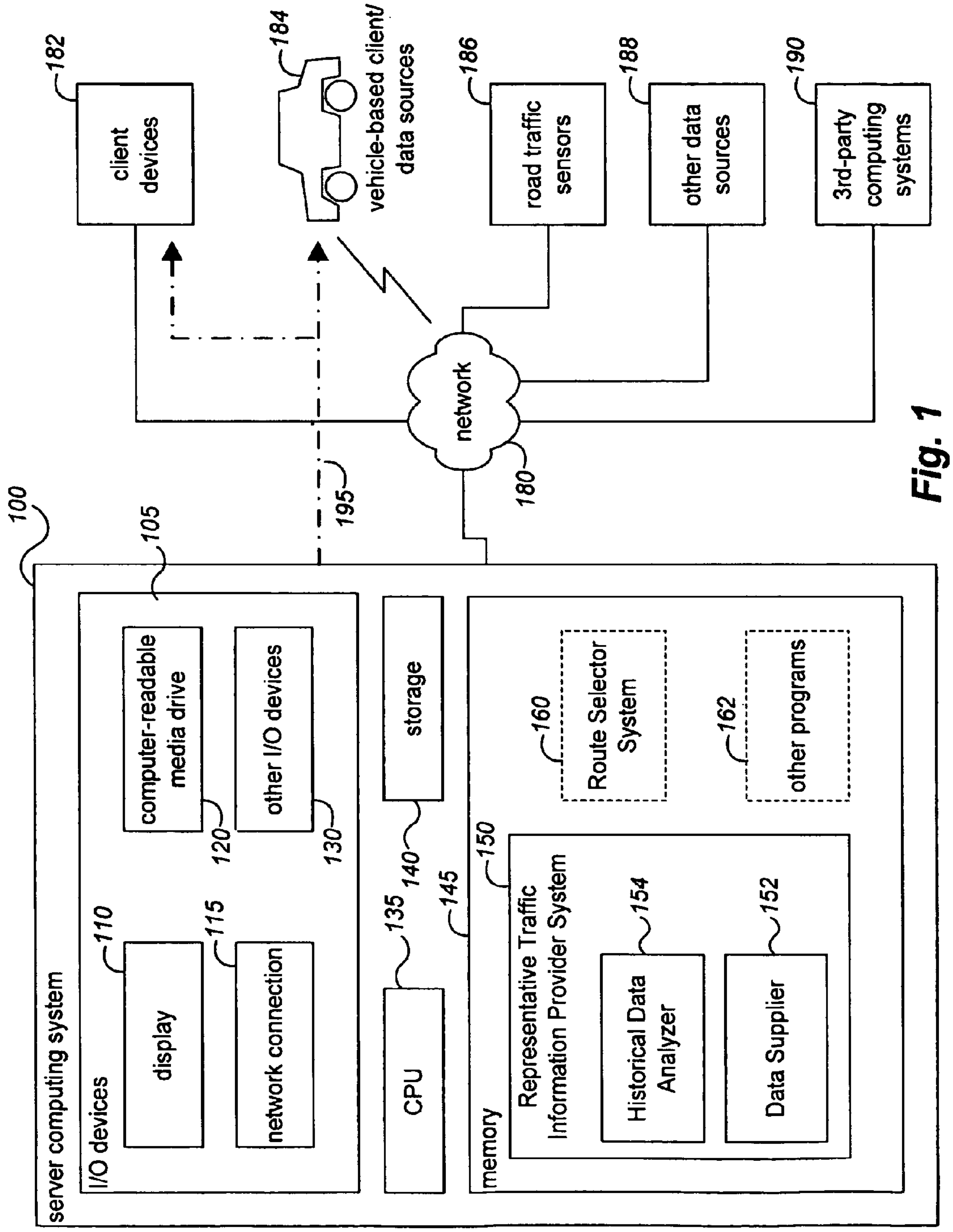
FIG. 1 is a block diagram illustrating a computing system suitable for executing an embodiment of the described Representative Traffic Information Provider system.

Techniques are described for automatically analyzing historical information about road traffic flow in order to generate representative information regarding future road traffic flow, and for using generated representative traffic flow information in various ways. In at least some embodiments, the historical information may include data readings from physical sensors that are near or embedded in the roads, and in at least some embodiments the historical information may include data samples from vehicles and other mobile data sources traveling on the roads. In addition, the historical information may in at least some embodiments include raw data (e.g., data readings directly from sensors), while in other embodiments may include information that has previously been filtered, conditioned and/or aggregated in various ways. In at least some embodiments, the described techniques are automatically performed as under control of an embodiment of a Representative Traffic Condition Information Provider ("RTIP") system. Additional details related to generating and using representative traffic flow information are included herein, and further details related to filtering, conditioning, aggregating information about road conditions and to generating predicted, forecast and representative traffic flow information are available in pending U.S. patent application Ser. No. 11/473,861, filed Jun. 22, 2006 and entitled "Obtaining Road Traffic Condition Data From Mobile Data Sources;" and in pending U.S. application Ser. No. 11/367,463, filed Mar. 3, 2006 and entitled "Dynamic Time Series Prediction of Future Traffic Conditions;" each of which is hereby incorporated by reference in its entirety.

Representative information may be generated for a variety of types of useful measures of traffic flow in various embodiments, such as for each of multiple road locations (e.g., road segments, road map links, particular points on roads, etc.) or other portions of roads during each of multiple time periods. For example, such traffic flow measures may include an average speed, a volume of traffic for an indicated period of time, an average occupancy time of one or more traffic sensors or other locations on a road (e.g., to indicate the average percentage of time that a vehicle is over or otherwise activating a sensor), one of multiple enumerated levels of road congestion (e.g., measured based on one or more other traffic flow measures), etc. Values for each such traffic flow measure may be represented at varying levels of precision in varying embodiments. For example, values for the average speed flow measure may be represented at the nearest 1-MPH ("mile per hour") increment, the nearest 5-MPH increment, in 5-MPH buckets (e.g., 0-5 MPH, 6-10 MPH, 11-15 MPH, etc.), in fractions of 1-MPH increments at varying degrees of precision, etc. Such traffic flow measures may also be measured and represented in absolute terms and/or in relative terms (e.g., to represent a difference from typical or from maximum). Additional details related to the generation of the representative information are included below.

Once representative traffic flow information is generated for particular road portions at particular times, the representative traffic flow information may be used in a variety of ways to assist in travel and for other purposes. For example, the generated representative traffic flow information may be used to plan an optimal route through a network of roads at a given travel time, to plan optimal timing for traveling a given route, to plan a likely amount of travel time for a given route at a particular time, etc. As such, generated representative traffic flow information may be a valuable addition to other information about roads, such as map information.

In some embodiments, historical traffic data may include information about traffic for various target roads of interest in a geographical area, such as for a network of selected roads in the geographic area. In some embodiments, one or more roads in a given geographic region may be modeled or represented by the use of road links. Each road link may be used to represent a portion of a road, such as by dividing a given physical road into multiple road links. For example, each link might be a particular length, such as a one-mile length of the road. Such road links may be defined, for example, by governmental or private bodies that create maps (e.g., by a government standard; by commercial map companies as a quasi-standard or de facto standard; etc.) and/or by a provider of the Representative Traffic Information Provider system (e.g., manually and/or in an automated manner), such that a given road may represented with different road links by different entities.

In addition, in some embodiments one or more roads in a given geographic region may be modeled or represented by the use of road segments, such as road segments defined by a provider of the Representative Traffic Information Provider system (e.g., manually and/or in an automated manner). Each road segment may be used to represent a portion of a road (or of multiple roads) that has similar traffic flow condition characteristics for one or more road links (or portions thereof) that are part of the road segment. Thus, a given physical road may be divided into multiple road segments, such as with multiple road segments that correspond to successive portions of the road, or alternatively in some embodiments by having overlapping or have intervening road portions that are not part of any road segment. In addition, each road segment may be selected so as to include some or all of one or more road links. Furthermore, a road segment may represent one or more lanes of travel on a given physical road. Accordingly, a particular multi-lane road that has one or more lanes for travel in each of two directions may be associated with at least two road segments, with at least one road segment associated with travel in one direction and with at least one other road segment associated with travel in the other direction. Similarly, if a road link represents a multi-lane road that has one or more lanes for travel in each of two directions, at least two road segments may be associated with the road link to represent the different directions of travel. In addition, multiple lanes of a road for travel in a single direction may be represented by multiple road segments in some situations, such as if the lanes have differing travel condition characteristics. For example, a given freeway system may have express or high occupancy vehicle ("HOV") lanes that may be beneficial to represent by way of road segments distinct from road segments representing the regular (e.g., non-HOV) lanes traveling in the same direction as the express or HOV lanes. Road segments may further be connected to or otherwise associated with other adjacent road segments, thereby forming a chain or network of road segments.

The roads and/or road segments/links for which representative traffic flow information is generated may be selected in various manners in various embodiments. In some embodiments, representative traffic flow information is generated for each of multiple geographic areas (e.g., metropolitan areas), with each geographic area having a network of multiple interconnected roads. Such geographic areas may be selected in various ways, such as based on areas in which historical traffic data is readily available (e.g., based on networks of road sensors for at least some of the roads in the area), in which traffic congestion is a significant problem, and/or in which a high volume of road traffic occurs at least at some times. In some such embodiments, the roads for which representative traffic flow information is generated include those roads for which historical traffic flow information is available, while in other embodiments the selection of such roads may be based at least in part on one or more other factors (e.g., based on size or capacity of the roads, such as to include freeways and major highways; based on the role the roads play in carrying traffic, such as to include arterial roads and collector roads that are primary alternatives to larger capacity roads such as freeways and major highways; based on functional class of the roads, such as is designated by the Federal Highway Administration; etc.). In addition, in some embodiments, representative traffic flow information is generated for some or all roads in one or more large regions, such as each of one or more states or countries (e.g., to generate nationwide data for the United States and/or for other countries or regions). In some such embodiments, all roads of one or more functional classes in the region may be covered, such as to include all interstate freeways, all freeways and highways, all freeways and highways and major arterials, all local and/or collector roads, all roads, etc. In other embodiments, representative traffic flow information generation calculations may be made for a single road, regardless of its size and/or interrelationship with other roads.

In at least some embodiments, representative traffic flow information for a particular road link or other portion of road is generated for each of one or more traffic flow aggregation categories, such as for some or all road links or other road portions. In particular, in at least some embodiments, various time-based categories are selected, and representative traffic flow information is separately generated for each of the time-based categories. As previously noted, in some embodiments, various time periods of interest may be selected, and each time-based category may be associated with one or more such time periods. As one example, time periods may be based at least in part on information about day-of-week and/or time-of-day (e.g., hour-of-day, minute-of-hour-of-day, etc.), such that each time-based category may correspond to one or more days-of-week and one or more times-of-day on those days-of-week. If, for example, each day-of-week and each hour-of-day are separately modeled with time-based categories, 168 (24*7) time-based categories may be used (e.g., with one category being Mondays from 9 am-9:59 am, another category being Mondays from 10 am-10:59 am, another category being Sundays from 9 am-9:59 am, etc.). In this example, representative traffic flow information for a road link and a particular time-based category, such as Mondays from 10 am-10:59 am, is generated at least in part by aggregating historical traffic information that corresponds to that road link and category, such as for traffic flow information reported for that road link on prior Mondays between 10 am and 10:59 am.

Alternatively, a particular time-based category may include a grouping of multiple days-of-week and/or hours-of-day, such as if the grouped times are likely to have similar traffic flow information (e.g., to group days of week and times of day corresponding to similar work commute-based times or non-commute-based times). A non-exclusive list of examples of day-of-week groupings include the following: (a) Monday-Thursday, Friday, and Saturday-Sunday; (b) Monday-Friday and Saturday-Sunday; (c) Monday-Thursday, Friday, Saturday, and Sunday; and (d) Monday-Friday, Saturday, and Sunday. A non-exclusive list of examples of time-of-day groupings include the following: (a) 6 am-8:59 am, 9 am-2:59 pm, 3 pm-8:59 pm, and 9 pm-5:59 am; and (b) 6 am-6:59 pm and 7 pm-5:59 am. Accordingly, one example group of time-based categories for which representative traffic flow information may be generated is as follows:

| Category | Day-Of-Week | Time-Of-Day |
|---|---|---|
| 1 | Monday-Thursday | 6 am-8:59 am |
| 2 | Monday-Thursday | 9 am-2:59 pm |
| 3 | Monday-Thursday | 3 pm-8:59 pm |
| 4 | Monday-Thursday | 9 pm-5:59 am |
| 5 | Friday | 6 am-8:59 am |
| 6 | Friday | 9 am-2:59 pm |
| 7 | Friday | 3 pm-8:59 pm |
| 8 | Friday | 9 pm-5:59 am |
| 9 | Saturday-Sunday | 6 am-6:59 pm |
| 10 | Saturday-Sunday | 7 pm-5:59 am |

Furthermore, in some embodiments, time periods for time-based categories may be selected for time increments of less than an hour, such as for 15-minute, 5-minute, or 1-minute intervals. If, for example, each minute-of-day for each day-of-week is separately represented, 10,080 (60*24*7) time-based categories may be used (e.g., with one category being Mondays at 9:00 am, another category being Mondays at 9:01 am, another category being Sundays at 9:01 am, etc.). In such an embodiment, if sufficient historical data is available, representative traffic flow information may be generated for a particular road link and a particular time-based category using only historical traffic information that corresponds to that road link and the particular minute for the time-based category, while in other embodiments historical information for a larger time duration may be used. For example, for an example time-based category corresponding to Mondays at 9:01 am, historical information from a rolling time duration of one hour (or another time duration) surrounding that time may be used (e.g., on Mondays from 8:31 am-9:31 am, on Mondays from 8:01 am-9:01 am, on Mondays from 9:01 am-10:01 am, etc.). In other embodiments, periods of time may be defined based on other than time-of-day and day-of-week information, such as based on day-of-month, day-of-year, week-of-month, week-of-year, etc.

In addition, in at least some embodiments, the traffic flow aggregation categories used for representative traffic flow information may be based on temporary or other variable conditions other than time that alter or otherwise affect traffic flow, whether instead of or in addition to time-based categories. In particular, in at least some embodiments, various condition-based categories may be selected, and representative traffic flow information may be separately generated for each of the condition-based categories for one or more road links or other road portions. Each such condition-based category may be associated with one or more traffic-altering conditions of one or more types. For example, in some embodiments, traffic-altering conditions related to a particular road link or other road portion that are used for condition-based categories for that road link/portion may be based on one or more of the following: weather status (e.g., based on weather in a geographic area that includes the road link/portion); status regarding occurrence of a non-periodic event that affects travel on the road link/portion (e.g., based on an event with sufficient attendance to affect travel on the road link/portion, such as a major sporting event, concert, performance, etc.); status regarding a current season or other specified group of days during the year; status regarding occurrence of one or more types of holidays or related days; status regarding occurrence of a traffic accident that affects travel on the road link/portion (e.g., a current or recent traffic accident on the road link/portion or on nearby road links/portions); status regarding road work that affects travel on the road link/portion (e.g., current or recent road work on the road link/portion or on nearby road links/portions); and status regarding school sessions that affects travel on the road link/portion (e.g., a session for a particular nearby school, sessions for most or all schools in a geographic area that includes the road link/portion, etc.).

As one example, the traffic flow aggregation categories used for representative traffic flow information in a particular embodiment may include 168 time-based categories corresponding to each combination of day-of-week and hour-of-day, 4 weather-related condition-based categories corresponding to levels of precipitation (e.g., none, low, medium, high), and 4 season-related condition-based categories corresponding to the four seasons (winter, spring, summer, and autumn), corresponding to 2,688 (168*4*4) distinct classifications of representative traffic flow information for a road link or other road portion. In this example, representative traffic flow information for a particular road link and a particular time-based category (e.g., Mondays from 10 am-10:59 am) is generated for each of the 16 combinations of the condition-based categories for that time-based category, such as to generate representative traffic flow information for the road link on Mondays from 10 am-10:59 am during winter while there is low precipitation at least in part by aggregating historical traffic information that corresponds to that road link and the combination of those categories (e.g., for traffic flow information reported for that road link on prior Mondays between 10 am and 10:59 am during the winter season while there was low precipitation). As another example, the traffic flow aggregation categories used for representative traffic flow information in another particular embodiment may include the 168 time-based categories corresponding to each combination of day-of-week and hour-of-day, and 4 holiday-related categories corresponding to types of holiday-related traffic impact (e.g., based on major holiday days observed by a substantial majority of people in the geographic area of the road link/portion; minor holiday days observed by a substantial minority or other portion of people in the geographic area; "proximate" holiday days that are sufficiently close to a major holiday day that a substantial minority or other portion of people in the geographic area do not work on the proximate holiday day, such as the Friday after Thanksgiving, or one or more weekdays between the weekend and a holiday such as Christmas or the Fourth of July when they occur mid-week; and other non-holiday days in the geographic area that are not any of a major holiday day, a minor holiday day, and a proximate holiday day in the geographic area), corresponding to 672 (168*4) distinct classifications of representative traffic flow information for a road link or other road portion. In this example, representative traffic flow information for a particular road link and a particular classification (e.g., a time-based category of Mondays from 10 am-10:59 am, and a holiday-related category of a non-holiday day) is generated at least in part by aggregating historical traffic information that corresponds to that road link and the combination of the time-based category and holiday-related category for the classification. In other embodiments, particular traffic-altering conditions may be represented in other manners, such as to have holiday-related categories based on three holiday-related conditions (e.g., holiday days that result in increased traffic, such as Thanksgiving; holiday days that result in decreased traffic, such as St. Patrick's Day; and non-holiday days), and to include holiday-related categories within other time-based categories or as condition-based categories.

In addition, in at least some embodiments, a particular client of the RTIP system may be allowed to configure or otherwise specify at least some traffic flow aggregation categories (e.g., to specify what days correspond to each of one or more seasons; to specify what days correspond to each of one or more holiday types; to specify what time periods to use; to specify whether to use any condition-based categories, and if so which ones; to specify whether to use any time-based categories, and if so which ones; etc.) and/or to specify particular road links or other road portions (e.g., a single road link of interest, for all the roads of one or more functional road classes in one or more geographic areas, etc.), and then receive representative traffic flow information that is generated for those traffic flow aggregation categories and road links/portions. Additional details related to generating representative traffic flow information are included elsewhere.

Once representative traffic flow information has been generated for one or more road links/portions and one or more traffic flow aggregation categories, a client may access and use that generated information in various ways. For example, in some embodiments, such representative traffic flow information may be generated for one or more geographic areas, and provided to multiple clients who may travel in that geographic area (e.g., on a computer-readable medium, such as on a DVD or CD; by being loaded on a portable device, such as on an in-vehicle navigation device or on a cell phone or other mobile communication device; by being downloaded to a client device over one or more networks, such as on request from the client device and/or in an automated push manner; etc.). A client may then specify one or more particular classifications, such as based on a selection of one of each of the traffic flow aggregation categories for each specified classification (e.g., a particular time and a particular weather status if the traffic flow aggregation categories include time-based categories and weather-related condition-based categories), and receive the corresponding representative traffic flow information for one or more road links or other road portions (e.g., by receiving a map of a geographic area that shows representative traffic flow information for one or more specified classifications for some or all of the road links or other road portions in that geographic area, by receiving a numeric value for a particular traffic flow measure for a particular road link and particular classification of representative traffic flow information, etc.).

Furthermore, in at least some embodiments, a particular client may be able to further obtain representative traffic flow information that is specialized for current conditions by dynamically obtaining current condition information (e.g., from the RTIP system, or from a third-party service), and then using that current condition information to select a particular classification of representative traffic flow information that corresponds to that current condition information, such as in an automated manner by a client device of the client. For example, if the traffic flow aggregation categories for the representative traffic flow information include categories based on time, season, holiday, and weather, the client device may be able to determine a current time (e.g., based on an internal clock, a WWVB transmission of a NIST-based time signal, etc.), determine a current season (e.g., based on season definitions stored by the client device, such as based on that information being disseminated along with the representative traffic flow information by the RTIP system; by dynamically interacting with the RTIP system or a calendar-based service; etc.), determine a current holiday (e.g., based on holiday definitions stored by the client device, such as based on that information being disseminated along with the representative traffic flow information by the RTIP system; by dynamically interacting with the RTIP system or a calendar-based service; etc.), and determine the current weather for the geographic area (e.g., based on information transmitted by the National Weather Service and/or a commercial weather service, based on direct observation using one or more sensors accessible to the client device, etc.). Similarly, in at least some embodiments a particular client may be able to further obtain representative traffic flow information that is specialized for a future time by dynamically obtaining expected future condition information for that future time (e.g., from the RTIP system, or from a third-party service), and then using that expected future condition information to select a particular classification of representative traffic flow information that corresponds to that future condition information, such as in an automated manner by a client device of the client.

In addition, in at least some embodiments, a particular client may store or otherwise have access to previously generated representative traffic flow information for one or more road links or other road portions, and be able to further obtain updated or otherwise improved representative traffic flow information for current and/or expected future conditions. In particular, in at least some embodiments the RTIP system may provide functionality for clients to dynamically request particular representative traffic flow information for one or more road links or other road portions (e.g., as a fee-based service), such as the most recently updated previously generated representative traffic flow information for those road links/portions (e.g., based on the most recently available historical data for those road links/portions), or newly updated representative traffic flow information that is generated by the RTIP system in response to the request from the client. In such embodiments, a particular client may be able to dynamically determine whether to obtain updated representative traffic flow information, such as in an automated manner by a client device of the client. Such a determination may be made in some embodiments based in part on a trade-off between costs of dynamically obtaining such updated representative traffic flow information (e.g., costs due to the data transmission service available to the client device, which may be low bandwidth and/or expensive to use for at least some in-vehicle or other portable devices; costs based on fees charged by the RTIP system for the information; etc.) and a perceived value of the updated information, such as may be specified by a human operator of the client device. Furthermore, in some embodiments, the representative traffic flow information may include information about accuracy, recency or other characteristics of particular traffic flow measure values of particular classifications, and a client device and/or human operator may determine to dynamically obtain updated representative traffic flow information for a particular traffic flow measure and classification based on the previously stored value lacking one or more desired characteristics (e.g., lacking a desired degree of accuracy based on having only a limited set of historical data for that traffic flow measure and classification at a time that the representative traffic flow information was previously generated).

As previously noted, representative traffic flow information may be generated for a particular target road link or other road portion and a particular target classification having one or more categories based at least in part on aggregating historical traffic information for the target road link/portion that corresponds to those categories of the target classification. In some embodiments, a minimum amount of historical data may be needed for a target road link/portion and classification in order to use that historical data, as discussed in greater detail below. Moreover, if such a minimum amount of data is not available for a particular target road link/portion and classification, in at least some embodiments, representative traffic flow information for the target road link/portion and classification may be generated based on using an expanded set of historical data for related road links and/or classifications, such as to expand a spatial area for which historical data is used, to expand time periods for which historical data is used, and/or to expand other conditions for which historical data is used. For example, in some embodiments, if such a minimum amount of data is not available for a particular target road link/portion and classification, successive road portions and classifications may be considered as follows: a road segment that includes the target road link/portion and the target classification; the target road link/portion and one or more other classifications related to the target classification (e.g., if the classification is based on a day-of-week and hour-of-day time-based category, on the same hour-of-day on all other or some other similar days-of-week); the road segment that includes the target road link/portion and the one or more related classifications; one or more adjacent nearest neighbor road links to the target road link and the target classification; the one or more adjacent nearest neighbor road links and the one or more related classification; some or all road links in the same geographic area as the target road link that are of the same functional road class and the target classification; and some or all of the road links in the same geographic area and the one or more related classifications. Other successive groups of road portions and classifications may be used in other embodiments. Furthermore, in some embodiments, if such a minimum amount of data is not available for a particular target road link/portion and classification that is based on one or more non-time condition-based categories, some or all of such condition-based categories may not be used for at least that target road link/portion (e.g., if there is not sufficient data for at least one weather-based category value, such as a medium level of precipitation, to combine medium precipitation with low or high levels of precipitation, or to not use any weather-based categories). Additional details related to generating representative traffic flow information are included elsewhere.

As noted, in at least some embodiments, a minimum amount of historical data may be needed for a target road link/portion and classification in order to use that historical data to generate representative traffic flow information for that road link/portion and classification, so that unusual traffic on a particular day does not unduly influence generated representative traffic flow information based on historical traffic data for that day. In such embodiments, the minimum amount of historical data for a target road link/portion and classification may be determined in various ways. For example, in some embodiments the historical data for a target road link/portion and classification may be determined to be sufficient if it includes data for a minimum number of distinct days and/or from a minimum number of distinct sources (e.g., at least four distinct historical data samples from four distinct weeks). In other embodiments, the historical data for a target road link/portion and classification may be determined to be sufficient in other manners, such as by determining that sufficient temporal statistical entropy exists in the group of historical data for the target road link/portion and classification (e.g., based on the prior times to which historical data values in the group correspond having sufficient temporal diversity, such as by corresponding to sufficient distinct days). The statistical entropy of a distribution of data points is a measure of the diversity of the distribution, and may be expressed as follows, $$H=(\text{for all } i)-\Sigma P_i \ln(P_i)$$

where i represents each distinct prior day, and $P_i$ indicates the percent of total points that come from that day. Thus, for example, if there are 5 points from one day and 10 points from another day, the temporal entropy H would be 0.276, obtained as follows:

$$H=-5/15*\ln(5/15)-10/15*\ln(10/15)$$

If the temporal entropy is less than a specified entropy reliability threshold (e.g., 1.38), the historical traffic data and resulting generated representative traffic flow information is deemed unreliable, and otherwise may be deemed reliable. Furthermore, in some embodiments, the historical data for a target road link/portion and classification may be determined to be sufficient based on having a sufficiently low statistical error confidence, whether in addition to or instead of having a sufficiently high temporal statistical entropy or other temporal diversity measure or temporal variance measure. A statistical error confidence estimate for an average speed traffic flow value based on an aggregation of multiple historical traffic flow values may be determined by, for example, $$\text{Error estimate} = \frac{\sigma}{\sqrt{N}}$$

where N is the number of historical traffic flow values and σ is the standard deviation of the values from the average speed, and the statistical error confidence estimate may be determined to be sufficiently low if it is less than a specified error confidence reliability threshold (e.g., if the error confidence estimate divided by the average speed traffic flow value is below 25%). Other forms of confidence values and estimates may similarly be determined for computed or generated average speeds in other embodiments.

Furthermore, when generating representative traffic flow information for a particular target road link or other road portion and particular classification, such as for a particular traffic flow measure, the RTIP system may in at least some embodiments generate one or more indications of the reliability of the generated value for that particular traffic flow measure and provide those reliability indications to clients as part of the generated representative traffic flow information. For example, using average speed as an example traffic flow measure, the RTIP system may generate a representative traffic flow information average speed value for a target road link/portion and target road classification by aggregating multiple historical average speed values that correspond to the target road link/portion and target classification, and then analyzing the aggregated historical average speed values in various ways. As one example, the RTIP system may determine a median or other average value for the aggregated historical average speed values, and select that average value as a most typical representative value. Furthermore, the RTIP system may determine a level of confidence or other reliability for that average value, such as based on a number of historical average speed values in the aggregation and any confidence information for those values. In addition, the RTIP system may use one or more techniques to determine reliability for the average value based on an amount of variability in the historical average speed values in the aggregation, such as represented by the variance or the standard deviation for the aggregation, temporal statistical entropy, and/or a statistical error confidence. Furthermore, in some embodiments the RTIP system may generate multiple representative values for a particular traffic flow measure for a target road link/portion and classification, such as to correspond to multiple percentile values or other indications of variability in the historical average speed values in the aggregation used to generate that representative traffic flow information (e.g., at the $1^{st}$, $5^{th}$, $10^{th}$, $15^{th}$, $25^{th}$, $50^{th}$, and $85^{th}$ percentiles). Moreover, in embodiments in which a client may configure or otherwise specify particular representative traffic flow information to be generated, the client may in some such embodiments specify such percentiles or other indications of variability or other reliability.

In embodiments in which one or more reliability indications are provided for a generated representative value for a traffic flow measure, such as multiple values at multiple percentile levels or other indications of the variability of the values of the traffic flow measure, such reliability indications may be used in various ways by clients to enhance the generated representative traffic flow information. For example, by using only average or other typical values for a traffic flow measure such as average speed for multiple roads in a geographic area, a client may determine a fastest route over the roads between two locations during typical traffic flow. However, in many situations, the traffic on a particular road on one route between two locations may have high variability, such that the traffic on that road may regularly be much worse than the average (e.g., the $25^{th}$ percentile average speed is far less than the $50^{th}$ percentile average speed), while the traffic on another road on another route between the two locations has very low variability (e.g., the traffic consistently stays near the average speed almost all of the time). In such situations, a particular client may prefer a route that is robust or otherwise stable with regard to degradations or other variations from average or typical traffic, such as to use roads that have low variability in their average speeds (e.g., if the $5^{th}$ and/or $95^{th}$ percentile typical speeds are sufficiently similar to the median $50^{th}$ percentile typical speed) or other traffic flow measure values. If so, the client may instead select the fastest route when traffic corresponds to a non-average percentile (e.g., at the $10^{th}$, $25^{th}$, or $75^{th}$ percentile), or the route that has the lowest variability.

In addition, as previously noted, in at least some embodiments clients may be able to dynamically interact with the RTIP system, such as to request the RTIP system to generate and/or provide particular representative traffic information. In some embodiments, at least some clients may further be provided with dynamic access to at least some underlying historical traffic data, such as for the RTIP system to provide an online data analysis service to such clients. In such embodiments, the clients may be able to interact with the RTIP system over one or more networks (e.g., via a Web browser, a specialized client-side application, etc.), such as to specify one or more types of analyses to perform on particular historical traffic data and to receive the results of the analyses. Alternatively, in some such embodiments, the clients may instead be able to interact with the RTIP system to retrieve particular historical traffic data, and then later perform their own analyses on the retrieved data, such as in an offline manner.

For illustrative purposes, some embodiments are described below in which specific types of measures of representative traffic flow are generated in specific ways using specific types of input, and in which generated measures are used in various specific ways. However, it will be understood that such measures may be generated in other manners and using other types of input data in other embodiments, that the described techniques may be used in a wide variety of other situations, that other types of traffic flow measures or other measures may similarly be generated and used in various ways, and that the invention is thus not limited to the exemplary details provided.

FIG. 1 is a block diagram illustrating an embodiment of a server computing system 100 that is suitable for performing at least some of the described techniques, such as by executing an embodiment of a Representative Traffic Information Provider system (also referred to at times as the RTIP system, and as a Representative Traffic Condition Information Provider system). The server computing system 100 includes a central processing unit ("CPU") 135, various input/output ("I/O") components 105, storage 140, and memory 145. Illustrated I/O components include a display 110, a network connection 115, a computer-readable media drive 120, and other I/O devices 130 (e.g., keyboards, mice or other pointing devices, microphones, speakers, etc.).

In the illustrated embodiment, a Representative Traffic Information Provider system 150 is executing in memory 145, as is an optional Route Selector system 160 and optional other systems provided by programs 162 (e.g., a predictive traffic forecasting program based at least in part on historical traffic data, a realtime traffic information provider system to provide traffic information to clients in a realtime or near-realtime manner, etc.), with these various executing systems generally referred to herein as historical traffic analysis systems. The server computing system and its executing historical traffic analysis systems may communicate with other computing systems, such as various client devices 182, vehicle-based clients and/or data sources 184, road traffic sensors 186, other data sources 188, and third-party computing systems 190, via network 180 (e.g., the Internet, one or more cellular telephone networks, etc.).

In particular, the Representative Traffic Information Provider system obtains historical traffic data from one or more of various sources, such as from a database (not shown) on storage 140 or from remote storage. As previously discussed, the historical data may include data in a raw form as originally previously received from one or more external sources, or may instead be stored and obtained in a processed form. For example, for each of one or more traffic flow measures of interest, the historical data may include values for that measure for some or all road segments and/or road links for each of a variety of prior time periods. They historical traffic data may have originally been generated by one or more external sources, such as vehicle-based data sources 184, road traffic sensors 186, other data sources 188, and/or third-party computing systems 190, and in some embodiments may alternatively be stored by one or more such sources and currently provided to the Representative Traffic Information Provider system from such storage. After obtaining the historical traffic data, the Representative Traffic Information Provider system then analyzes the historical data to generate representative traffic flow information for one or more of various measures. The generated representative traffic flow information may then be used in various ways, such as to be provided to the Route Selector system, client devices 182, vehicle-based clients 184, third-party computing systems, and/or other users.

The client devices 182 may take various forms in various embodiments, and may generally include any communication devices and other computing devices capable of making requests to and/or receiving information from the historical traffic analysis systems. In some cases, the client devices may run interactive console applications (e.g., Web browsers) that users may utilize to make requests for generated representative traffic-related information based on historical traffic information, while in other cases at least some such generated representative traffic-related information may be automatically sent to the client devices (e.g., as text messages, new Web pages, specialized program data updates, etc.) from one or more of the historical traffic analysis systems.

The vehicle-based clients/data sources 184 in this example may each include a computing system located within a vehicle that provides data to one or more of the historical traffic analysis systems and/or that receives data from one or more of those systems. In some embodiments, the historical information used by the Representative Traffic Information Provider system may originate at least in part from a distributed network of vehicle-based data sources that provide information related to current traffic flow. For example, each vehicle may include a GPS ("Global Positioning System") device (e.g., a cellular telephone with GPS capabilities, a stand-alone GPS device, etc.) and/or other geo-location device capable of determining the geographic location, speed, direction, and/or other data related to the vehicle's travel. One or more devices on the vehicle (whether the geo-location device(s) or a distinct communication device) may occasionally gather such data and provide it to one or more of the historical traffic analysis systems (e.g., by way of a wireless link). For example, a system provided by one of the other programs 162 may obtain and use current road traffic flow information in various ways), and such information (whether as originally obtained or after being processed) may later be used by the Representative Traffic Information Provider system as historical data. Such vehicles may include a distributed network of individual users, fleets of vehicles (e.g., for delivery companies, transportation companies, governmental bodies or agencies, vehicles of a vehicle rental service, etc.), vehicles that belong to commercial networks providing related information (e.g., the OnStar service), a group of vehicles operated in order to obtain such traffic flow information (e.g., by traveling over predefined routes, or by traveling over roads as dynamically directed, such as to obtain information about roads of interest), etc. In addition, such vehicle-based information may be generated in other manners in other embodiments, such as by cellular telephone networks, other wireless networks (e.g., a network of Wi-Fi hotspots) and/or other external systems (e.g., detectors of vehicle transponders using RFID or other communication techniques, camera systems that can observe and identify license plates and/or users' faces) that can detect and track information about vehicles passing by each of multiple transmitters/receivers in the network.

Moreover, while not illustrated here, in at least some embodiments other mobile data sources may similarly provide current data based on current travel on the roads, such as based on computing devices and other mobile devices of users who are traveling on the roads (e.g., users who are operators and/or passengers of vehicles on the roads). Such current travel data related to current road conditions may in some embodiments be combined with the historical traffic information in various ways, such as to select representative traffic information generated for particular categories that correspond to the current road conditions.

The vehicle-based travel-related information may be used for a variety of purposes, such as to provide information similar to that of road sensors but for road segments that do not have functioning road sensors (e.g., for roads that lack sensors, such as for geographic areas that do not have networks of road sensors and/or for arterial roads that are not significantly large to have road sensors, for road sensors that are broken, etc.), to verify duplicative information that is received from road sensors or other sources, to identify road sensors that are providing inaccurate data (e.g., due to temporary or ongoing problems), etc. Moreover, in some embodiments, additional information may be generated and provided by a mobile device based on multiple stored data samples. For example, if a particular mobile device is able to acquire only information about a current instant position during each data sample, but is not able to acquire additional related information such as speed and/or direction, such additional related information may be calculated or otherwise determined based on multiple subsequent data samples.

Alternatively, some or all of the vehicle-based clients/data sources 184 may each have a computing system located within a vehicle to obtain information from one or more of the historical traffic analysis systems, such as for use by an occupant of the vehicle. For example, the vehicle may contain an in-dash navigation system with an installed Web browser or other console application that a user may utilize to make requests for traffic-related information via a wireless link from the Representative Traffic Information Provider system or the Route Selector system, or instead such requests may be made from a portable device of a user in the vehicle. In addition, one or more of the historical traffic analysis systems may automatically transmit traffic-related information to such a vehicle-based client device (e.g., updated measures of representative traffic flow and/or updated route-related information) based upon the receipt or generation of updated information.

The road traffic sensors 186 include multiple sensors that are installed in, at, or near various streets, highways, or other roadways, such as for one or more geographic areas. These sensors include loop sensors that are capable of measuring the number of vehicles passing above the sensor per unit time, vehicle speed, and/or other data related to traffic flow. In addition, such sensors may include cameras, motion sensors, radar ranging devices, and other types of sensors that are located adjacent to a roadway. The road traffic sensors 186 may periodically or continuously provide measured data via wire-based or wireless-based data link to one or more of the historical traffic analysis systems via the network 180 using one or more data exchange mechanisms (e.g., push, pull, polling, request-response, peer-to-peer, etc.). For example, a system provided by one of the other programs 162 may obtain and use current road traffic flow information in various ways, and that such information (whether as originally obtained or after being processed) may later be used as historical information by the Representative Traffic Information Provider system. In addition, while not illustrated here, in some embodiments one or more aggregators of such road traffic sensor information (e.g., a governmental transportation body that operates the sensors, a private company that generates and/or aggregates data, etc.) may instead obtain the traffic data and make that data available to one or more of the historical traffic analysis systems (whether in raw form or after it is processed). In some embodiments, the traffic data may further be made available in bulk to the historical traffic analysis systems.

The other data sources 188 include a variety of types of other sources of data that may be utilized by one or more of the historical traffic analysis systems to generate representative traffic flow information and/or to make selections of traffic routes. Such data sources include, but are not limited to, holiday and season schedules or other information used to determine how to group and categorize historical data for specific days and times, schedule information for non-periodic events, schedule information related to traffic sessions, schedule information for planned road construction and other road work, etc.

Third-party computing systems 190 include one or more optional computing systems that are operated by parties other than the operator(s) of the historical traffic analysis systems, such as parties who provide current and/or historical traffic data to the historical traffic analysis systems, and parties who receive and make use of traffic-related data provided by one or more of the historical traffic analysis systems. For example, the third-party computing systems may be map vendor systems that provide data (e.g., in bulk) to the historical traffic analysis systems. In some embodiments, data from third-party computing systems may be weighted differently than data from other sources. Such weighting may indicate, for example, how many measurements participated in each data point. Other third-party computing systems may receive generated representative traffic-related information from one or more of the historical traffic analysis systems and then provide related information (whether the received information or other information based on the received information) to users or others (e.g., via Web portals or subscription services). Alternatively, the third-party computing systems 190 may be operated by other types of parties, such as media organizations that gather and report such traffic-related information to their consumers, or online map companies that provide such traffic-related information to their users as part of travel-planning services.

In the illustrated embodiment of FIG. 1, the Representative Traffic Information Provider system 150 includes a Data Supplier component 152 and a Historical Data Analyzer 154.

The Data Supplier component 152 obtains data that may be used by the Representative Traffic Information Provider system, such as from the storage sources and/or other data sources previously discussed, and makes the information available to the Historical Data Analyzer component and optionally to other components and historical traffic analysis systems. In some embodiments, the Data Supplier may detect and/or correct various errors in the data (e.g., due to sensor outages and/or malfunctions, network outages, data provider outages, etc.), such as if the obtained data is raw historical data that was not previously processed. For example, data may be filtered and/or weighted in various ways to remove or deemphasize data from consideration if it is inaccurate or otherwise unrepresentative of historical traffic flow information of interest, including by identifying data samples that are not of interest based at least in part on roads with which the data samples are associated and/or data samples that are statistical outliers with respect to other data samples. In some embodiments, the filtering may further include associating the data samples with particular roads, road segments, and/or road links. The data filtering may further exclude data samples that otherwise reflect vehicle locations or activities that are not of interest (e.g., parked vehicles, vehicles circling in a parking lot or structure, etc.) and/or data samples that are otherwise unrepresentative of vehicle travel on roads of interest. Additional details related to performing data error detection and correction are described in pending application Ser. No. 11/473,861, filed Jun. 22, 2006 and entitled “Obtaining Road Traffic Condition Data from Mobile Data Sources,” which is herein incorporated by reference in its entirety.

In some embodiments, the Data Supplier component may optionally aggregate obtained data from a variety of data sources, and may further perform one or more of a variety of activities to prepare data for use, such as to place the data in a uniform format; to discretize continuous data, such as to map real-valued numbers to enumerated possible values; to sub-sample discrete data; to group related data (e.g., a sequence of multiple traffic sensors located along a single segment of road that are aggregated in an indicated manner); etc. Information obtained by the Data Supplier component may be provided to other historical traffic analysis systems and components in various ways, such as to notify others when new data is available, to provide the data upon request, and/or to store the data in a manner that is accessible to others (e.g., in one or more databases on storage, not shown).

The Historical Data Analyzer component 154 uses corrected historical traffic flow data provided by the Data Supplier component to generate representative traffic flow information for one or more measures of representative traffic flow. The measures may include, for example, average vehicle speed; volume of traffic for an indicated period of time; average occupancy time of one or more traffic sensors, etc. The generated representative traffic flow information may then be stored for later use, such as in a database (not shown) on storage 140.

Once representative traffic flow information has been generated for one or more traffic flow measures, one or more clients and/or other historical traffic analysis systems may use the information in various ways. For example, the Route Selector system 160 may optionally select travel route information based on the representative traffic flow information, such as based on projected average speed or other traffic flow projected to occur based on that representative traffic flow information, and may provide such route information to others in various ways. In some embodiments, the Route Selector system receives a request from a client to provide information related to one or more travel routes between desired starting and ending locations in a given geographic area at a desired day and/or time. In response, the Route Selector system obtains representative traffic flow information for the specified area during the specified day and/or time (e.g., from stored data previously generated by the Representative Traffic Information Provider system, or by dynamically requesting the Representative Traffic Information Provider system to currently generate such data), and then utilizes the representative traffic flow information to analyze various route options and to select one or more routes. Alternatively, the Route Selector system may receive a request from a client to provide information relating to an optimal time to travel a desired route between specified starting and ending locations. In response, the Route Selector system obtains representative traffic flow information across the desired route at various times, and then utilizes the measures to analyze various timing options and to select one or more optimal times to travel the desired route. Furthermore, in some such embodiments, the Route Selector system may receive information about variability or other reliability of the representative traffic flow information values for roads along candidate routes, and select an optimal or other preferred route based at least in part on such reliability information (e.g., to determine a route that is most reliable if traffic degrades, a route that is fastest at a particular percentile of historical traffic values, etc.).

The selected route information may then be provided to other historical traffic analysis systems and components and/or to others in various ways, such as to notify others when information is available, to provide the information upon request, and/or to store the information in a manner that is accessible to others (e.g., as a CSV (Comma-Separated Values) file stored on a compact disk and/or as one or more databases stored on storage 140).

In addition, in some embodiments at least some information generated by one or more of the historical traffic analysis systems may be stored on one or more physical media (e.g., a CD, DVD, portable memory key, printed paper, etc.), and distributed 195 to clients on such media for their later use. For example, the representative traffic information generated by the Representative Traffic Information Provider system may include representative data that projects traffic flow information for any day and time in the future for one or more geographical areas (e.g., organized by day and time-of-day; by grouping some days and times together, such as to provide representative traffic information for a periods of time for a particular geographic area that correspond to typical commute times for that geographic area on particular work days; etc.), such as for the entire United States or other combination of one or more geographic areas. If so, such representative traffic information may be distributed to clients on physical media, and may later be used by the clients to obtain representative traffic flow information for a particular road, day and time that may project likely traffic flow information for that road, day and time based on historical information about road conditions on that road at corresponding days and times (e.g., when using the data in a manner that is not connected to the Representative Traffic Information Provider system and/or any other systems). In some embodiments, the clients will use such generated representative traffic information without further interaction with one or more of the historical traffic analysis systems, while in other embodiments may interact with one or more of the historical traffic analysis systems to obtain current updated information. For example, current updated information may be newly generated representative traffic flow information for use in replacing previously generated representation traffic flow information (e.g., to reflect recent historical data and/or additional historical data), and/or may include other types of information to supplement generated representative traffic information for one or more roads at a particular day and time (e.g., by, at a time shortly before or at the day and time of interest, obtaining information that reflects current conditions that may affect the representative traffic flow for those roads at that day and time, such as unusual current conditions that may include unusual weather, traffic accidents or other incidents, road construction or other projects on or near the roads, atypical events, etc.).

In addition, in some embodiments, the generated representative traffic flow information may be used as one type of input to a system that predicts and/or forecasts future traffic flow information based on current conditions, such as by using the representative traffic flow information to project current conditions (e.g., if the current condition information is not available at the time of prediction, or by using the representative traffic flow information at an earlier time to perform the prediction or forecast in advance). Additional details related to example predictions and forecasts are included in pending application Ser. No. 11/367,463, filed Mar. 3, 2006 and entitled "Dynamic Time Series Prediction of Future Traffic Conditions," which is herein incorporated in its entirety. Alternatively, in at least some embodiments an embodiment of the Representative Traffic Information Provider system may use such a predictive system to predict or otherwise forecast representative information, such as by limiting input to the predictive system to a particular subset (e.g., just historical traffic data, historical traffic data and a limited set of current condition information, etc.).

It will be appreciated that the illustrated computing systems are merely illustrative and are not intended to limit the scope of the present invention. Computing system 100 may be connected to other devices that are not illustrated, including through one or more networks such as the Internet or via the Web. More generally, a "client" or "server" computing system or device, or historical traffic analysis system and/or component, may comprise any combination of hardware or software that can interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate inter-communication capabilities. In addition, the functionality provided by the illustrated system components may in some embodiments be combined in fewer components or distributed in additional components. Similarly, in some embodiments the functionality of some of the illustrated components may not be provided and/or other additional functionality may be available.

In addition, while various items are illustrated as being stored in memory or on storage while being used, these items or portions of them can be transferred between memory and other storage devices for purposes of memory management and/or data integrity. Alternatively, in other embodiments some or all of the software components and/or modules may execute in memory on another device and communicate with the illustrated computing system/device via inter-computer communication. Furthermore, in some embodiments, some or all of the components may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the system components or data structures may also be stored (e.g., as software instructions or structured data) on a computer-readable medium, such as a hard disk, a memory, a network, or a portable media article to be read by an appropriate drive or via an appropriate connection. The system components and data structures can also be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 2:
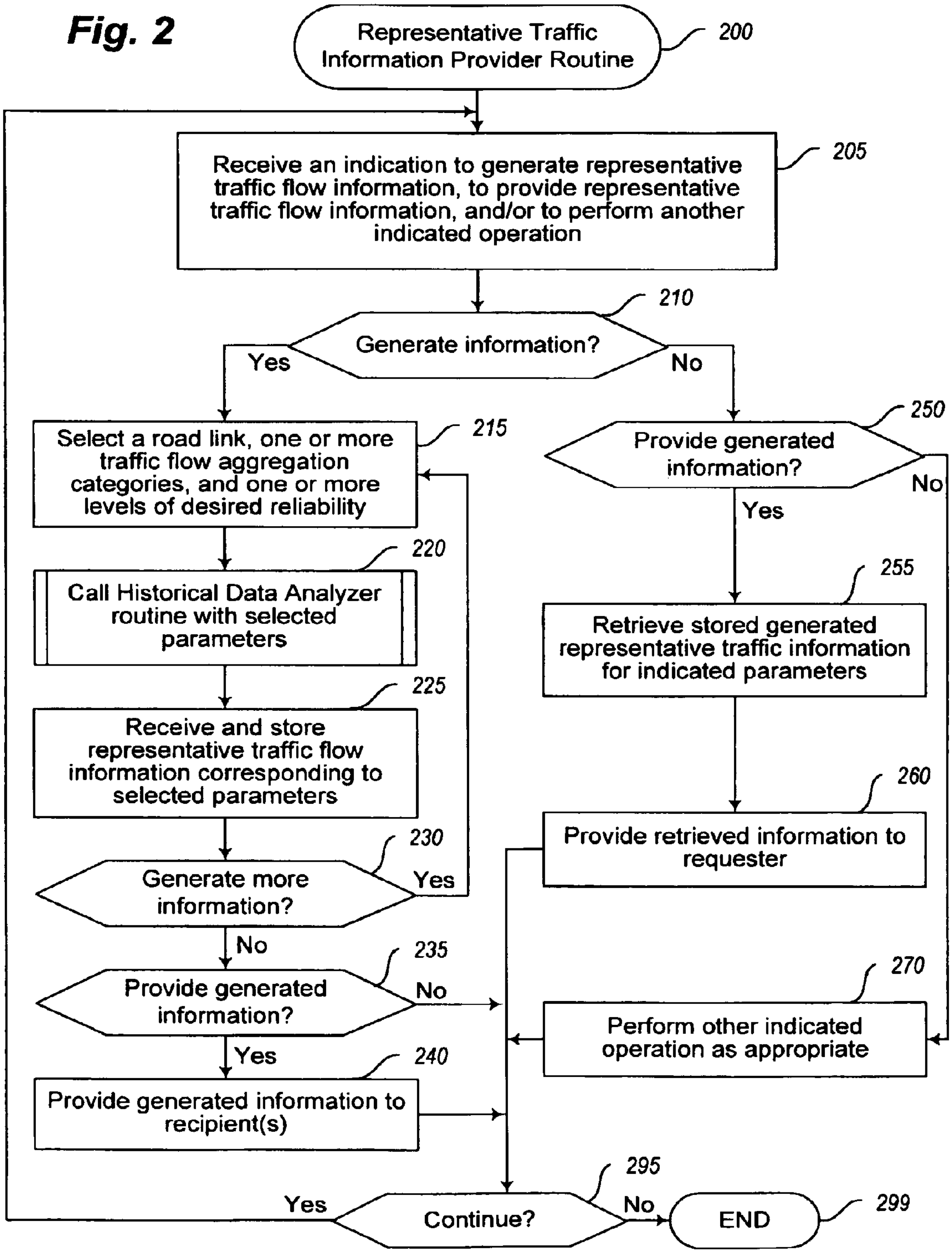
FIG. 2 is a flow diagram of an example embodiment of a Representative Traffic Information Provider routine.

FIG. 2 is a flow diagram of an example embodiment of a Representative Traffic Information Provider routine 200. The routine may be provided by, for example, execution of the RTIP software system 150 of FIG. 1, such as to generate and provide representative traffic flow information for roads based on historical traffic information.

The routine begins in step 205, where it receives an indication to generate representative traffic flow information, to provide representative traffic flow information, and/or to perform another indicated operation. An indication to generate representative traffic flow information may be received, for example, due to expiration of a timer to initiate periodic generation of the representative traffic flow information, due to the receipt of additional historical traffic data from which updated representative traffic flow information may be generated, due to receipt of a request from a client, etc. A client request may, for example, specify information about types of representative traffic flow information to generate, such as indications of one or more road links or other road portions (e.g., for all available road links in a specified geographic area; for a particular group of road links, such as to correspond to a route along one or more roads; etc.), of one or more types of traffic flow information categories and/or classifications for which to generate the representative traffic flow information, and/or of one or more types of variability or other reliability information about the representative traffic flow information values to provide. Similarly, a periodic trigger to generate representative traffic flow information may be for particular representative traffic flow information (e.g., as indicated by the trigger, based on any new historical traffic data that is available since a prior generation of representative traffic information, etc.), or for any representative traffic flow information that the RTIP system may generate. Receipt of additional historical traffic data may initiate generation of representative traffic flow information that corresponds to the historical traffic data, any representative traffic flow information that the RTIP system may generate, or may not initiate the generation of any representative traffic flow information.

In the illustrated embodiment, the routine continues to step 210 to determine a type of indication received in step 205. If the indication of step 205 initiates the generation of representative traffic flow information, the routine continues to step 215 to select an initial combination of a particular road link, particular traffic flow aggregation classification corresponding to one or more categories, and optionally one or more desired variability or other reliability indication levels for which representative traffic flow information is to be generated, beginning with a first such combination if multiple combinations are to be generated. As previously discussed, such determination of what representative traffic flow information is to be generated may be determined in various ways, such as based on information received in step 205. In addition, in the illustrated example embodiment, representative traffic flow information is generated for a single such combination at a time, but in other embodiments may be generated in other manners, such as by generating representative traffic flow information for multiple such combinations in parallel or otherwise together so as to enhance the efficiency of aggregating particular groups of related historical data. After selecting a particular combination for which representative traffic flow information is to be generated, the routine continues to step 220 to execute a Historical Data Analyzer routine for that selected combination, an example of which is described in greater detail with respect to FIG. 3. In step 225, the routine then receives and stores the generated representative traffic flow information for the selected combination, and continues to step 230 to determine whether there are more such combinations for which to generate representative traffic flow information, and if so returns to step 215 to select the next such combination. For example, if using time-based categories that represent each day-of-week and each hour-of-day for each day-of-week separately, so as to result in 168 (7*24) distinct classifications, the loop of steps 215-230 may be performed 168 times for each road link for which all possible representative traffic flow information is being generated.

If it is instead determined in step 230 that there are not more such combinations for which to generate representative traffic flow information, the routine continues instead to step 235 to determine whether to provide the representative traffic flow information generated in step 220 to one or more recipients, such as a client from whom a corresponding request was received in step 205 and/or to one or more other recipients based on previously indicated preferences for representative traffic flow information. If so, the, routine continues to step 240 to provide the representative traffic flow information generated in step 220 to the one or more recipients, such as via one or more transmissions over one or more networks.

If it is instead determined in step 210 that the indication received in step 205 was not to generate representative traffic flow information, the routine continues instead to step 250 to determine whether the indication received in step 205 was a request to provide previously generated representative traffic flow information of one or more types to one or more recipients, such as representative traffic flow information for one or more indicated combinations of a road link and traffic flow information aggregation classification. If so, the routine continues to step 255 to retrieve stored representative traffic information of the one or more types that was previously generated, and in step 260 provides the retrieved information to the recipient(s). If it is instead determined in step 250 that the indication received in step 205 is not to provide indicated representative traffic flow information, the routine continues instead to step 270 to perform another indicated operation as appropriate. For example, if historical traffic data is received, that data may be stored in step 270 for later use in generating representative traffic flow information. In some embodiments, the routine may provide functionality by which clients may request and receive particular historical traffic data and/or may initiate particular client-specified analyses of particular historical traffic data, and if so the routine may perform such operations in step 270. A variety of other types of actions may be performed in other embodiments.

After steps 240, 260 or 270, or if it was instead determined in step 235 not to provide the generated representative traffic flow information, the routine continues to step 295 to determine whether to continue. If so, the routine returns to step 205, and if not continues to step 299 and ends.

Figure 3:
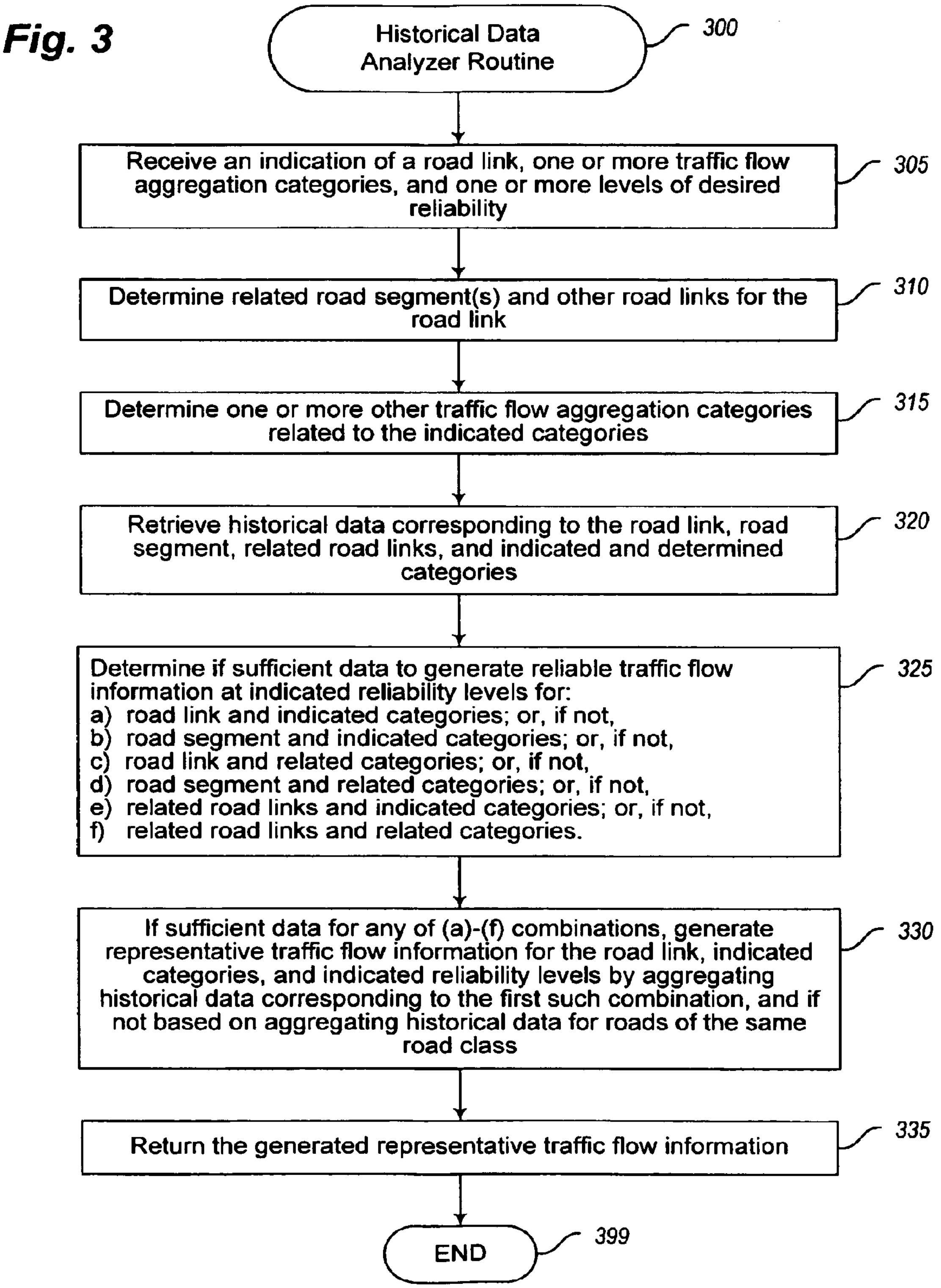
FIG. 3 is a flow diagram of an example embodiment of a Historical Data Analyzer routine.

FIG. 3 is a flow diagram of an example embodiment of a Historical Data Analyzer routine 300. The routine of FIG. 3 may be provided by, for example, execution of the Historical Data Analyzer component 154 in FIG. 1, such as to generate representative traffic flow information for a particular road link and traffic flow aggregation classification based on one or more categories. In this illustrated embodiment, the routine generates representative average speed traffic flow information, but in other embodiments may generate representative traffic flow information for one or more other measures, such as occupancy, volume, etc., whether in addition to or instead of average speed. The routine may, for example, be prompted to perform the generation for each road link of interest in one or more geographic areas, and using traffic flow information aggregation classifications based on time-based categories that each correspond to one or more time periods, such as for every day of the year, day of the month, day of the week, etc., and for each 1-minute increment, 5-minute increment, 15-minute increment, half-hour increment, hour increment, multi-hour time period (e.g., by separating each day into several periods of time that each are expected or determined to have similar traffic flow condition characteristics), etc. on each such day. The analysis for a particular road link and traffic flow information classification may be performed only once, or instead may be performed multiple times (e.g., periodically, such as to reflect additional historical data that becomes available over time). In addition, in the illustrated embodiment, representative traffic flow information is generated only when sufficient historical data is available to ensure a desired level of reliability, such as by considering a succession of differing groups of historical data until a group with sufficient historical data is reached. In other embodiments, the routine may generate representative traffic flow information in one or more other ways, such as for road segments, by considering additional types of information beyond historical data for that particular measure being used, by, etc.

Figure 4:
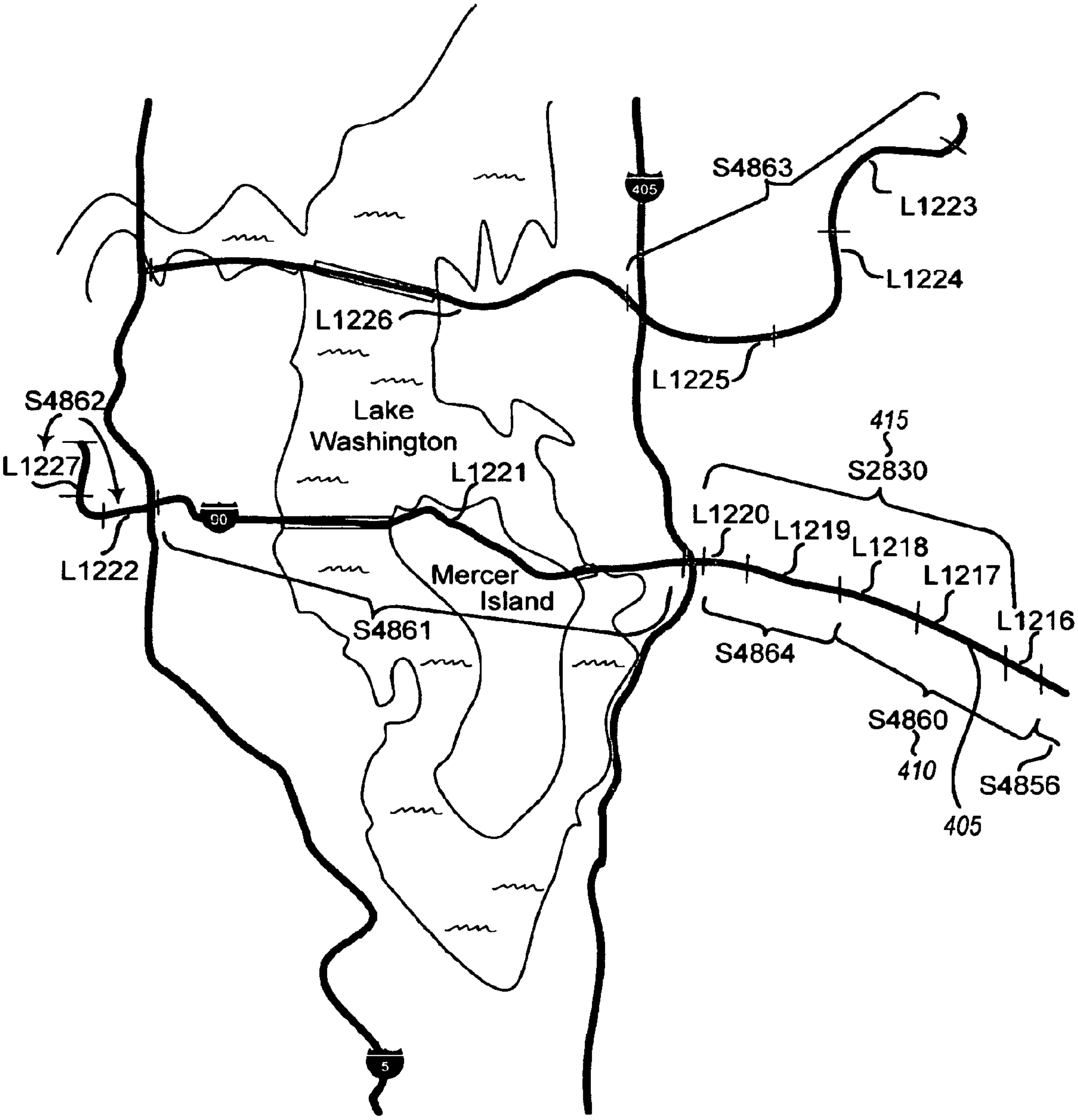
FIG. 4 illustrates an example map with designators indicating a variety of portions of roads of interest.

In this example, the routine will be discussed in terms of a first example in which the routine computes an average speed for westbound travel along a road link L1217 during the 8-9 a.m. hour on Mondays, with FIG. 4 illustrating an example map that indicates example road links and road segments (or "traffic segments") for the purpose of discussion. In other embodiments, a particular traffic flow information classification for which road traffic flow information is generated may include one or more non-time condition-based categories, such as related to weather, seasons, holidays, etc. In this example, road link L1217 is a link 405 that corresponds to the road Interstate 90 in the greater Seattle metro area, and has adjacent road links L1216 and L1218. In this example, road link 1217 is a bi-directional link that corresponds to both eastbound and westbound traffic, and thus is part of two road segments 410 and 415 that each correspond to one of the directions. In particular, example road segment S4860 corresponds to westbound traffic and includes the westbound traffic of link L1217 (as well as the westbound traffic of adjacent links L1216 and L1218), and example road segment S2830 corresponds to eastbound traffic and includes the eastbound traffic of link L1217 (as well as the eastbound traffic of nearby links L1218, L1219 and L1220). Road links and road segments may have various relationships in various embodiments, such as road link L1221 and road segment S4861 corresponding to the same portion of road, several road segments corresponding to multiple contiguous road links while road segment S4862 corresponds to non-contiguous road links L1227 and L1222. In addition, while various road links are of differing lengths in this example embodiment, in other embodiments the road links may all be the same length.

The routine 300 begins at step 305, where an indication is received of a particular road link, traffic flow information aggregation classification based on one or more categories (e.g., one or more time-based categories that each include information about one or more time periods, such as based on day-of-week and time-of-day information), and optionally one or more desired variance or other reliability level indications. In step 310, the routine then determines a related road segment for the indicated road link (e.g., a road segment that includes the indicated road link) and one or more related road links for the indicated road link (e.g., one or more adjacent or other nearest neighbor road links), such as for use if there is not sufficient historical traffic data for the indicated road link and aggregation classification—in embodiments in which multiple road segments may be related to the road link, each such road segment may be used, or instead a single one of the multiple road segments may be selected (e.g., in this example, road segment S4860 since it corresponds to westbound travel, which is the representative traffic flow information of interest). In step 315, the routine then determines one or more related aggregation classifications for the indicated aggregation classification, such as for use if there is not sufficient historical traffic data for the indicated road link and aggregation classification. For example, for a classification based at least in part on a time-based category, related classifications may be based on other related time categories (e.g., a same time on other day, a related time on the same or other day, etc.). The routine then continues to step 320 to retrieve historical traffic data that corresponds to the various combinations of the indicated road link, related road link(s) and related road segment, and indicated and related road classifications.

In step 325, the routine then determines whether there is sufficient historical traffic data available to compute an average speed for travel along the indicated road link for the indicated aggregation classification, such as by analyzing the retrieved historical traffic data for that combination according to one or more sufficiency criteria. Various criteria may be used to determine sufficiency of the available historical data in various embodiments. For example, a predetermined number of data samples (e.g., road sensor readings, mobile data source data samples, etc.) corresponding to westbound travel along link L1217 during the 8-9 a.m. hour on Mondays may be used to evaluate sufficiency. Criteria other than number of data points may be used alternatively or additionally, including based on the statistical temporal entropy of the historical traffic data values being above a predefined minimum threshold and/or a statistical error confidence in a typical traffic flow value based on an aggregation of the historical traffic data values being below a predefined maximum threshold, using reliability of particular data samples (e.g., to not retrieve or use data samples unless they have been previously processed and identified as being correct, such as via filtering and outlier detection), etc.

Regardless of the method of determining data sufficiency, if sufficient data exists to make the calculation, the routine proceeds to step 330 and calculate the average speed for the historical traffic data samples for the combination of the indicated road link and indicated aggregation classification. While not illustrated here, the routine may in some embodiments further optionally determine whether the computed average speed value meets a specified reliability threshold. The specified reliability threshold may, for example, be based on a statistical temporal entropy of the historical traffic flow values, on a statistical error confidence in the average speed traffic flow value based on an aggregation of the historical traffic data values, and/or on a minimum and/or a maximum for average speeds, such as to consider an average speed above a predefined upper limit and/or below a predefined lower limit as being unreliable (e.g., an upper limit of 75 MPH for all roads or for freeway roads, an upper limit for roads of other types such as a 40 MPH limit for residential streets, an upper limit based on a posted speed limit for a road, etc.). If the computed average speed value does not meet a specified reliability threshold, the routine may determine not to use such an unreliable calculated average speed value (or in some embodiments to reduce any such computed average speed higher than the limit to the limit). In such embodiments, if the calculated average speed value is determined to be unreliable, the routine may return to step 325 to determine another combination of information for which to generate representative traffic flow information for the indicated road link and aggregation classification.

If there is not sufficient historical traffic data available to calculate an average speed for travel along the indicated road link for the indicated aggregation classification, the routine in step 325 determines whether there is sufficient historical traffic data available to compute an average speed for travel along the indicated road link for the indicated aggregation classification using a next combination of road portion and aggregation classification in a succession of multiple such combinations. In particular, in the illustrated embodiment, the routine next determines if there is sufficient historical traffic data available to calculate an average speed based on the following:

the determined related road segment and the indicated aggregation classification;

the indicated road link and the determined related aggregation classification(s);

the determined related road segment and the determined related aggregation classification(s);

the determined related road link(s) and the indicated aggregation classification; and the determined related road link(s) and the determined related aggregation classification(s).

The routine then continues to step 330, and for the first such combination in the succession for which there is sufficient historical traffic data, the routine calculates an average speed for the indicated road link and aggregation classification by using historical traffic data samples corresponding to that combination. If none of the combinations in the succession have sufficient historical traffic data, the routine calculates an average speed for the indicated road link and aggregation classification in step 330 by aggregating historical traffic data for some or all roads of the same road class as that of the indicated road link in the geographical area of the indicated road link.

As previously noted, the determined related road segment may be the road segment that includes the indicated road link and that corresponds to the appropriate direction of travel. If multiple such road segments exist and each have sufficient historical data (e.g., if there are overlapping road segments), one of them may be selected (e.g., based on which road segment may best correspond to the road link), or instead the subsequent analysis may be performed for multiple (e.g., all) of such road segments (e.g., to calculate an average over the average speeds for all such road segments).

In addition, related aggregation classifications may be determined in various ways. For example, if the aggregation classification includes a time-based category that specifies a particular selected day-of-week and time-of-day, a determination may be made whether there is enough data to compute the average speed for westbound travel over link L1217 for the same time-of-day during similar days (e.g., all weekdays if the selected day is a weekday, all weekend days if the selected day is a weekend, a subset of similar weekdays if the selected day is a weekday, etc.). Similar days may be selected for other types of day designations in a similar manner, such as to select similar days for a particular day of the year that is a weekday by using other weekdays of that week, days of other weeks that are the same weekday, days of other months that are the same monthday (e.g., first day of the month, first Monday of the month, etc.) as the selected day, etc. In addition, in some embodiments, holidays are treated differently than other days of the week, such as to consider some or all holidays similar to each other but not to non-holidays, while in alternative embodiments the holiday status of a particular day would be ignored.

Moreover, related road links for the indicated road link may be determined in various ways, such as to use one or more "nearest neighbor" road links and/or one or more "nearest neighbor" road segments for the one or more road segments that correspond to the given link. A determination of whether sufficient historical data is available may be made in various ways, such as based on whether a sufficient number of such nearest neighbor road links and/or road segments each individually have enough historical data to calculate a sufficient average speed for the indicated road link. For example, with respect to road segment S4860, nearest neighbor road segments may include at least one on one side, such as road segment S4864 in this example; at least two on one side, such as road segments S4864 and S4861 in this example; at least one on each side, such as road segments S4864 and S4856 in this example; etc. Alternatively, the determination may be based on whether sufficient historical data exists to calculate an average speed for all of those nearest neighbor road segments if combined together (e.g., for at least one neighbor or two neighbors, and including any available data points for the relevant road segment, which in this example is S4860). In addition, in some embodiments, data from one or more road segments may be weighted more heavily than others, such as to weight more heavily data relating to an "incoming" road segment (e.g., road segment S4856 in this example, such the travel of interest is westbound and road segment S4856 is just to the east) than data relating to an "outgoing" road segment. Also, in some embodiments, data may be weighted differently based on the lengths of the participating road segments and/or using other factors.

Furthermore, in at least some embodiments, the routine may in step 330 calculate one or more types of metadata for the calculated average speed. In the illustrated embodiment, the routine may calculate indicated reliability levels for the calculated average speed, such as to calculate multiple representative speeds that each correspond to a different percentile or other level of variability for the historical traffic data samples used to generate the representative traffic flow information average speed for the indicated road link and aggregation classification. In other embodiments, metadata for the calculated average speed may have other forms, such as a generated degree of confidence that a calculated average speed is accurate (e.g., based on the temporal entropy, on the number of historical data points used, etc.). As previously noted, in at least some embodiments, the historical data that is used in generating representative data and in such a temporal entropy calculation will be data that has previously been processed and corrected if appropriate (e.g., by the Data Supplier component, or previously by one or more other components that used the historical data when it was first generated), such as data that is filtered to remove data that is inaccurate or otherwise unrepresentative of historical traffic conditions of interest (e.g., by identifying data samples that are not of interest based at least in part on roads with which the data samples are associated and/or based on activities of vehicles to which the data samples correspond) and/or data samples that are statistical outliers with respect to other data samples. In addition, in at least some embodiments the current or prior processing of the data may provide information related to the expected error of a particular data sample or group of data (e.g., such as based on outlier analysis or other measure of variability or error), and if so such expected error may further be used as part of the calculated metadata. After step 330, the routine continues to step 335 and returns the generated representative traffic flow information, including any variability level or other reliability level information.

In other embodiments, the routine may vary in various ways. For example, the routine may generate representative average speed information for road segments rather than for road links. In addition, as previously mentioned, similar analyses may be performed for traffic flow measures other than average speed, such as to generate representative traffic volume and occupancy based on historical traffic volume and occupancy data, respectively. In addition, in the illustrated embodiment some steps analyze historical data for a given time but on other similar days. In other embodiments, the routine may analyze historical data for similar times, whether on the given day or for other similar days. Similar times may be determined in various ways, such as by expanding a given time period to be a larger time period, to consider other neighboring time periods, to consider other time periods with similar traffic characteristics (e.g., a morning commute time may be similar to an evening commute time, or the beginning of a morning commute time may be similar to the end of the morning commute time), etc.

As previously discussed, FIG. 4 shows an exemplary map of a network of roads in the Seattle/Tacoma Metro geographical area of the state of Washington. As previously discussed, road link 1217 is included in segment S4860, along with other links, namely L1216 and L1218. Therefore, if any of links L1216, L1217, and/or L1218 lacked sufficient data to compute an average speed, the average speed for the entire road segment S4860 may be used for that particular link. In some embodiments, the average speed for S4860 may be used for all links in the segment; while in other embodiments, the average speed for S4860 may only be used for the link lacking sufficient data of its own.

Note that in this example, road link L1220 of segment S4864 has a shorter distance than some other links. In other embodiments, all road links may be a consistent length, and/or may vary from the example in other manners (e.g., may each be much shorter than the example links shown). In addition, road segments may include not only contiguous road links (such as road segments S4860, S4863, and S4864), but also non-contiguous road links. For example, road segment S4862 in FIG. 3 includes road links L1222 and L1227, despite the fact that the two road links are not contiguous. However, both links may have similar traffic flow characteristics so as to be grouped together in one road segment. Also, for ease of illustration, only one link and/or segment designator per physical road portion is shown; but, as noted above, each lane may be assigned one or more unique link and/or section designators. Similarly, each direction of traffic for a bi-directional road portion may be assigned one or more unique link and/or section designators.

Figure 5:
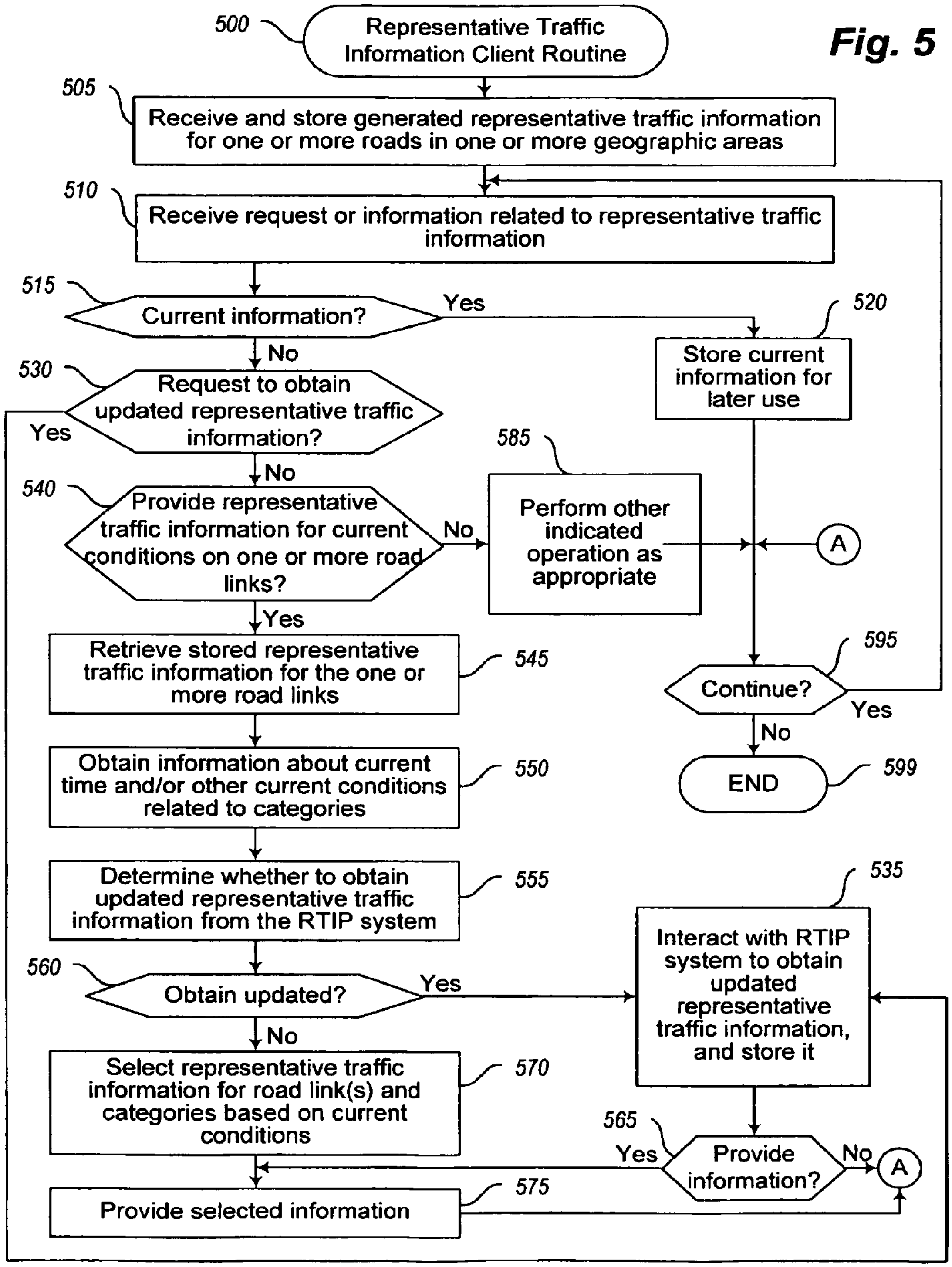
FIG. 5 is a flow diagram of an example embodiment of a Representative Traffic Information Client routine.

FIG. 5 is a flow diagram of an example embodiment of a Representative Traffic Information Client routine 500. The routine may be provided by, for example, execution of a component on a client device 182 or 184 to obtain and use generated representative traffic flow information.

The routine begins at step 505, where representative traffic flow information for one or more roads in one or more geographic areas is obtained and stored, such as by being preloaded on a device, by being downloaded to a device over a network, by being loaded on a device from a DVD or CD, etc. In step 510, the routine then receives a request or receives information related to representative traffic flow information, and in step 515 determines whether current information has been received (e.g., recently generated representative traffic information, information about current conditions, etc.). If so, the routine continues to step 520 to store the current information for later use, and if not continues to step 530 to determine whether a request is received from a user to obtain updated representative traffic flow information. If so, the routine continues to step 535 to interact with the RTIP system to obtain and store updated representative traffic flow information corresponding to the user request, such as for one or more particular road links (e.g., all road links in a particular geographic area, all road links along a particular route, a road link at a particular location, etc.), one or more particular aggregation classifications, etc. After step 535, the routine continues to step 565 to determine whether the user request was further to provide the updated representative traffic flow information after it is obtained, and if so continues to step 575 to provide the obtained information to the user (e.g., as part of a map that is displayed on the client device, in textual form, etc.).

If it is instead determined in step 530 that the indication received in step 510 is not a user request for updated representative traffic flow information, the routine continues to step 540 to determine whether the indication is a request to provide representative traffic information to the user for current conditions on one or more road links. If not, the routine continues to step 585 to perform another indicated operation as appropriate, such as to retrieve and provide representative traffic flow information to the user for one or more indicated road links and one or more indicated aggregation classifications, to obtain current condition information from the RTIP system or other source, to interact with the RTIP system to obtain historical traffic data and/or to analyze retrieved historical traffic data in one or more ways, to interact with the RTIP system to request that the RTIP system perform one or more analyses on historical traffic data and provide resulting information, etc.

If it is determined in step 540 that the indication received in step 510 is a request to provide representative traffic information to the user for current conditions on one or more road links, the routine continues to step 545 to retrieve stored representative traffic flow information for the one or more road links. In step 550, the routine then obtains information about the current time and/or about current conditions related to categories used for aggregate classifications of the retrieve stored representative traffic flow information for the one or more road links, such as by retrieving recently stored information, interacting with the RTIP system or other external source, etc. In step 555, the routine then determines whether to obtain updated representative traffic flow information from the RTIP system for at least one of the one or more road links, such as based on the stored representative traffic flow information to be updated having a lower degree of reliability or accuracy than is desired, based on the representative traffic flow information being of particular value (e.g., a value that exceeds a cost of obtaining the representative traffic flow information), etc. If so, the routine continues to step 535 to obtain the updated representative traffic flow information, and then continues to step 565 and 575 as previously described. If it is determined in step 555 to not obtain updated representative traffic flow information, the routine continues instead to step 570 to select the retrieved stored representative traffic flow information that corresponds to the one or more road links and aggregation classifications of interest based on the current condition information, and then continues to step 575 to provide the selected representative traffic flow information. In other embodiments, step 550 may be performed before step 545, such that stored representative traffic flow information may be retrieved only for a classification that corresponds to the current time and conditions.

After steps 520, 575, or 585, or if it is instead determined in step 565 not to provide information, the routine continues to step 595 to determine whether to continue. If so, the routine returns to step 510, and if not continues to step 599 and ends.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited therein. In addition, while certain aspects of the invention may be presented in certain claim forms, the inventors contemplate the various aspects of the invention in any available claim form. For example, while only some aspects of the invention may be recited as being embodied in a computer-readable medium, other aspects may likewise be so embodied.

What is claimed is:

1. A computer-implemented method for generating representative traffic flow information for roads to facilitate future travel, the method comprising:

receiving an indication of a location on a road in a geographic area;

selecting multiple time-based categories for which representative traffic flow information will be distinctly generated for the road location, the multiple time-based categories each corresponding to one or more time periods based on day-of-week and time-of-day information;

selecting multiple other condition-based categories for which representative traffic flow information will be distinctly generated for the road location, the multiple condition-based categories each corresponding to at least one of multiple variable traffic-altering conditions that affect traffic in the geographic area, the multiple traffic-altering conditions including one or more holiday-based conditions that each has a corresponding condition-based category;

for each of multiple distinct prior times, obtaining, by a configured computing system, one or more prior traffic flow values that correspond to actual traffic flow at the road location at the prior time, at least some of the prior traffic flow values each corresponding to one of the one or more holiday-based conditions;

for each of the at least some prior traffic flow values, associating, by the configured computing system, the prior traffic flow value with at least one of the time-based categories and at least one of the condition-based categories, the at least one time-based categories being determined by matching the prior time to time periods to which the time-based categories correspond, and the at least one condition-based categories being determined by matching the one or more traffic-altering conditions to which the prior traffic flow value corresponds to traffic-altering conditions to which the condition-based categories correspond, such that a prior traffic flow value for a prior time that corresponds to an occurrence of a holiday related to one of the holiday-based conditions is associated with the condition-based category corresponding to that one holiday-based condition;

for each of one or more traffic flow aggregation classifications that each includes at least one of the time-based and condition-based categories, automatically generating, by the configured computing system, representative traffic flow information for traffic at the road location corresponding to the traffic flow aggregation classification, the generating of the representative traffic flow information being based at least in part on aggregating the prior traffic flow values associated with the at least one categories and on determining one or more typical traffic flow values based on the aggregated traffic flow values; and providing, by the configured computing system, one or more indications of the generated representative traffic flow information for the road location for use in facilitating travel on the road at future times.

2. The method of claim 1 wherein the obtaining of the prior traffic flow values and the automatic generating of representative traffic flow information is performed for each of multiple road locations that are each one of multiple predefined road links on a network of roads in a geographic area, the predefined road links such that traffic flow is distinctly tracked for each of the road links, wherein the obtained prior traffic flow values for the multiple road locations include numerous retrieved historical traffic data samples that each report a speed of traffic on one of the road links at an indicated prior time such that at least some reported traffic speeds are each influenced at least in part by one or more traffic-altering conditions at the prior time for the traffic speed, wherein the one or more traffic flow aggregation classifications include multiple traffic flow aggregation classifications that each correspond to a distinct combination of a time-based category and a condition-based category, wherein the determining of the one or more typical traffic flow values for a road location and a traffic flow aggregation classification includes determining a typical average speed on the road location for the traffic flow aggregation classification and includes determining one or more variability measure values for the reported speeds of the aggregated prior traffic values associated with the categories of the traffic flow aggregation classification, and wherein the providing of the indications of the generated representative traffic flow information includes facilitating navigation of vehicles over the network of roads based on the generated representative traffic flow information by providing the generated representative traffic flow information to each of multiple client devices so that users of the client devices may determine likely travel times over the roads at various times and for various of the traffic-altering conditions based on the typical traffic speeds on the roads at those times and for those traffic-altering conditions.

3. The method of claim 2 further comprising, under control of one of the client devices:

receiving and storing the provided generated representative traffic flow information; and at each of multiple times, determining one or more of the road links of interest for possible travel;

determining current traffic-altering conditions;

determining one or more of the aggregation classifications that correspond to the time and to the determined traffic-altering conditions;

retrieving the stored representative traffic flow information for the determined road links and determined aggregation classifications, so as to identify the determined typical average speed for the determined road links under the determined current traffic-altering conditions; and presenting the retrieved representative traffic flow information for the determined road links and determined aggregation classifications to a user of the device for use in facilitating navigation over at least some of the determined road links.

4. The method of claim 3 wherein the configured computing system is part of an automated representative traffic information provider system, wherein the generated representative traffic flow information is provided to the one client device from the representative traffic information provider system via storage of the generated representative traffic flow information on a physical computer-readable medium that is accessible to the one client device, and wherein the method further comprises, under control of the one client device:

receiving an indication to dynamically obtain updated representative traffic flow information via a network connection;

interacting with the representative traffic information provider system over the network connection to dynamically obtain the updated representative traffic flow information; and storing the updated representative traffic flow information for use in lieu of the provided representative traffic flow information to which the updated representative traffic flow information corresponds.

5. The method of claim 2 wherein the time periods each include a distinct combination of a day-of-week and a time-of-day duration of one or more minutes on that day-of-week, and wherein the multiple traffic-altering conditions that affect traffic in the geographic area further include multiple weather-related conditions and multiple season-based conditions, such that the multiple aggregation classifications include a distinct aggregation classification for each distinct combination of day-of-week, time-of-day duration, weather-related condition, holiday-related condition, and season-based condition.

6. The method of claim 5 wherein the determined typical average speed for a road link and aggregation classification is based on a median of the reported speeds of the aggregated prior traffic values associated with the categories of the aggregation classification and road link, wherein the one or more variability measure values of reported speeds include speeds corresponding to multiple percentiles other than a $50^{th}$ percentile, and wherein the determined variability measure values of the generated representative traffic flow information are further for use in determining likely variability of typical travel times over the roads at various times and for various of the traffic-altering conditions.

7. The method of claim 6 wherein the determining of one or more typical traffic flow values for a road link and aggregation classification based on aggregated prior traffic flow values includes using the aggregated prior traffic flow values only if the aggregated prior traffic flow values are automatically determined to provide sufficient temporal variability and sufficient statistical error confidence, and, if the aggregated prior traffic flow values are not automatically determined to provide sufficient temporal variability and sufficient statistical error confidence, determining the one or more typical traffic flow values for the road link and aggregation classification based at least in part on other selected data samples that correspond to one or more of a road segment that includes the road link and one or more other road links that have similar traffic flow patterns, other nearby road links, and other aggregation classifications that are related to the aggregation classification.

8. The method of claim 7 wherein the network of roads includes roads for which traffic sensors are available to provide information about current traffic flow, wherein the numerous data samples include data samples provided by the traffic sensors, and wherein the numerous data samples further include data samples provided by multiple vehicles traveling on the roads.

9. The method of claim 1 further comprising, after the automatic generating of the representative traffic flow information for the road location, determining likely traffic flow for the road location at an indicated future time by:

determining one of the time-based categories associated with the indicated future time;

determining one of the condition-based categories related to traffic on the road location at the indicated future time;

retrieving generated representative traffic flow information for the road location and for an aggregation classification that includes the determined one time-based category and the determined one condition-based category; and providing the retrieved representative traffic flow information to indicate the determined likely traffic flow for the road location at the indicated future time.

10. The method of claim 1 further comprising, at a time after the automatic generating of the representative traffic flow information for the road location, determining likely current traffic flow for the road location by:

determining a current time and a current traffic-altering condition that affects traffic in the geographic area at the current time;

selecting an aggregation classification that includes one of the time-based categories to which the determined current time corresponds and one of the condition-based categories to which the determined current traffic-altering condition corresponds;

retrieving the generated representative traffic flow information for the road location that corresponds to the selected aggregation classification; and providing the retrieved representative traffic flow information to indicate the determined likely traffic flow for the road location at the current time.

11. The method of claim 1 wherein each of the time-based categories corresponds to one or more days-of-week and to one or more time-of-day periods on the one of more days-of-week, such that the associating of a prior traffic flow value for a prior time at the road location includes associating that prior traffic flow value with one of the time-based categories based at least in part on the prior time being on a day-of-week and during a time-of-day period that matches the corresponding days-of-week and time-of-day periods for that one time-based category.

12. The method of claim 11 wherein each of the time-based categories corresponds to one day-of-week and to one hour-long time-of-day period on the one day-of-week, such that 168 time-based categories are used to represent the 24 one-hour-long time-of-day periods for the 7 day-of-week days.

13. The method of claim 11 wherein the time-based categories each correspond to one of multiple time-of-day periods whose starting times differ by at most 5 minutes, such that at least 288 time-based categories are used to represent times during a day.

14. The method of claim 11 further comprising, before selecting the multiple time-based categories, receiving a request that specifies the one or more days-of-week and the one or more time-of-day periods on the one of more days-of-week for each of the multiple distinct time-based categories, and wherein the selecting of the multiple time-based categories includes defining the multiple time-based categories based on the request.

15. The method of claim 1 wherein at least some of the condition-based categories each corresponds to one of multiple seasons, such that the associating of a prior traffic flow value for a prior time at the road location includes associating that prior traffic flow value with one of the condition-based categories based at least in part on a season at that prior time matching a corresponding season for that one condition-based category.

16. The method of claim 15 further comprising, before selecting the multiple condition-based categories, receiving a request to specify multiple distinct seasons that each correspond to multiple days, and wherein the selecting of the multiple condition-based categories includes defining the seasons for the condition-based categories based on the request.

17. The method of claim 1 wherein each of the time-based categories further corresponds to one or more seasons, such that the associating of a prior traffic flow value for a prior time at the road location further includes associating that prior traffic flow value with one of the time-based categories based at least in part on a season at that prior time matching a corresponding season for that one time-based category.

18. The method of claim 1 wherein the one or more holiday-based conditions include multiple holiday-based conditions that each has a corresponding condition-based category.

19. The method of claim 18 wherein the multiple holiday-based conditions include a first type corresponding to major holiday days observed by a substantial majority of people in the geographic area, a second type corresponding to minor holiday days observed by a substantial minority of people in the geographic area, a third type corresponding to proximate holiday days that are sufficiently close to a major holiday day that a substantial portion of people in the geographic area do not work on the proximate holiday days, and a fourth type corresponding to non-holiday days in the geographic area that are not any of a major holiday day, a minor holiday day, and a proximate holiday day in the geographic area.

20. The method of claim 18 wherein the multiple holiday-based conditions include a first holiday type during which road traffic in the geographic area increases relative to a non-holiday day in the geographic area, a second holiday type during which road traffic in the geographic area decreases relative to a non-holiday day in the geographic area, and a third type for non-holiday days.

21. The method of claim 18 further comprising, before selecting the multiple condition-based categories, receiving a request to specify days that correspond to each of the multiple holiday-based conditions, and wherein the selecting of the multiple condition-based categories includes defining the multiple holiday-based conditions for the condition-based categories based on the request.

22. The method of claim 1 wherein each of the time-based categories further corresponds to one or more holiday types or to a non-holiday, such that the associating of a prior traffic flow value for a prior time at the road location further includes associating that prior traffic flow value with one of the time-based categories based at least in part on a match between a non-holiday or a type of holiday at the prior time and a corresponding non-holiday or holiday type for that one time-based category.

23. The method of claim 1 wherein at least some of the condition-based categories each corresponds to one of multiple weather-based conditions, such that the associating of a prior traffic flow value for a prior time at the road location includes associating that prior traffic flow value with one of the condition-based categories based at least in part on weather at that prior time matching corresponding weather for that one condition-based category.

24. The method of claim 1 wherein at least some of the condition-based categories each corresponds to one of multiple conditions related to occurrences of non-periodic events, such that the associating of a prior traffic flow value for a prior time at the road location includes associating that prior traffic flow value with one of the condition-based categories based at least in part on a match between a condition at that prior time related to an occurrence of a non-periodic event and a corresponding non-periodic event occurrence condition for that one condition-based category.

25. The method of claim 1 wherein at least some of the condition-based categories each corresponds to one of multiple conditions related to occurrences of traffic accidents, such that the associating of a prior traffic flow value for a prior time at the road location includes associating that prior traffic flow value with one of the condition-based categories based at least in part on a match between a condition at that prior time related to an occurrence of a traffic accident and a corresponding traffic accident occurrence condition for that one condition-based category.

26. The method of claim 1 wherein at least some of the condition-based categories each corresponds to one of multiple conditions related to occurrences of road work, such that the associating of a prior traffic flow value for a prior time at the road location includes associating that prior traffic flow value with one of the condition-based categories based at least in part on a match between a condition at that prior time related to an occurrence of road work and a corresponding road work occurrence condition for that one condition-based category.

27. The method of claim 1 wherein at least some of the condition-based categories each corresponds to one of multiple conditions related to occurrences of school sessions, such that the associating of a prior traffic flow value for a prior time at the road location includes associating that prior traffic flow value with one of the condition-based categories based at least in part on a match between a condition at that prior time related to an occurrence of school sessions and a corresponding school session occurrence condition for that one condition-based category.

28. The method of claim 1 wherein the time-based categories and the condition-based categories are independent of each other such that the associating of a prior traffic flow value for a prior time at the road location includes associating that prior traffic flow value with one of the time-based categories and with one of the condition-based categories.

29. The method of claim 1 wherein the configured computing system is remote from multiple client devices, wherein the indications of the generated representative traffic flow information for the road location are provided to the multiple client devices for local use by the client devices in facilitating travel on the road at future times, and wherein the method further comprises, after the providing of the indications of the generated representative traffic flow information for the road location and under control of one of the client devices:

for each of multiple future times, determining likely traffic flow at the future time for the road location by retrieving the provided generated representative traffic flow information for the road location from one or more local storage locations; and for each of one or more other future times, determining at the future time likely traffic flow at the future time for the road location by dynamically interacting with the configured computing system to obtain updated information regarding likely traffic flow at the future time for the road location.

30. The method of claim 29 wherein the providing of the indications of the generated representative traffic flow information for the road location to a client device includes storing the generated representative traffic flow information for the road location on one or more non-volatile storage devices that are accessible to the client device.

31. The method of claim 29 wherein the obtaining of updated information by dynamic interacting with the configured computing system has greater costs than the retrieving of information from the one or more local storage locations, and wherein the method further comprises automatically determining for a future time whether benefits from having updated information regarding likely traffic flow at that future time for the road location exceed the greater costs of obtaining that updated information.

32. The method of claim 1 wherein the configured computing system is remote from multiple client devices, wherein the indications of the generated representative traffic flow information for the road location are provided to the multiple client devices for local use by the client devices in facilitating travel on the road at future times, and wherein the method further comprises, at a time after the providing of the indications of the generated representative traffic flow information for the road location and under control of one of the client devices:

determining a current time and a current traffic-altering condition that affects traffic in the geographic area at the current time;

selecting an aggregation classification that includes one of the time-based categories to which the determined current time corresponds and one of the condition-based categories to which the determined current traffic-altering condition corresponds;

retrieving the generated representative traffic flow information for the road location that corresponds to the selected aggregation classification; and providing the retrieved representative traffic flow information to indicate the determined likely traffic flow for the road location at the current time.

33. The method of claim 32 wherein the providing of the indications of the generated representative traffic flow information for the road location to a client device includes storing the generated representative traffic flow information for the road location on one or more non-volatile storage devices that are accessible to the client device.

34. The method of claim 32 wherein the determining of the current traffic-altering condition that affects traffic in the geographic area at the current time includes dynamically interacting with the configured computing system to obtain an indication of the determined current traffic-altering condition.

35. The method of claim 1 wherein the generating of the representative traffic flow information for traffic at the road location for each of the one or more aggregation classifications includes generating one of more indications of reliability of at least one of the determined typical values.

36. The method of claim 35 wherein, for each of the one or more aggregation classifications, the aggregation classification has multiple associated prior traffic flow values for a traffic flow measurement for multiple prior times, the determined typical values for the traffic flow information for the aggregation classification indicating a most likely value for the traffic flow measurement for the aggregation classification, and the one or more indications of reliability being based at least in part on a statistical analysis of the multiple traffic flow measurement values for the multiple prior times.

37. The method of claim 35 wherein, for each of the one or more aggregation classifications, the aggregation classification has multiple associated prior traffic flow values for a traffic flow measurement for multiple prior times, the determined typical values for the traffic flow information for the aggregation classification indicating an average traffic flow measurement value that is based substantially on the $50^{th}$ percentile for the multiple prior traffic flow values, and the one or more indications of reliability including multiple determined traffic flow measurement values for the aggregation classification other than the average value that are based substantially on multiple other percentiles for the multiple prior traffic flow values.

38. The method of claim 37 further comprising, before the generating of the representative traffic flow information for traffic at the road location, receiving a request that specifies the multiple other percentiles, and wherein determining of the multiple traffic flow measurement values based substantially on the multiple other percentiles is based on the request.

39. The method of claim 35 wherein, for each of the one or more aggregation classifications, the aggregation classification has multiple associated prior traffic flow values for a traffic flow measurement for multiple prior times, the determined typical values for the traffic flow information for the aggregation classification indicating a median traffic flow measurement value based on the multiple prior traffic flow values, and the one or more indications of reliability including multiple deviation indications that each indicate a likelihood that an actual value for the traffic flow measurement for the road location at a future time that corresponds to the aggregation classification will deviate from a median traffic flow measurement value by at least a specified amount.

40. The method of claim 39 further comprising, before the generating of the representative traffic flow information for traffic at the road location for each of the one or more aggregation classifications, receiving a request that specifies one or more amounts of deviation from a median value and/or one or more degrees of likelihood, and wherein the generating of the multiple deviation indications is based on the request.

41. The method of claim 35 wherein the generated one or more indications of reliability of at least one of the determined typical values for an aggregation classification are for use by a client in determining a route that includes the road location and whose travel time remains substantially stable when traffic flow conditions vary from average traffic flow conditions.

42. The method of claim 35 wherein the generated one or more indications of reliability of at least one of the determined typical values for an aggregation classification are for use by a client in determining a route that includes the road location and that is a fastest route in an indicated situation in which traffic flow conditions differ from average traffic flow conditions.

43. The method of claim 1 further comprising:

receiving multiple requests that are each from a client regarding at least one indicated type of analysis of at least some of the prior traffic flow values for the road location; and for each of the requests, after performing one or more analyses that correspond to the at least one indicated type of analysis for the request, providing information to the client for the request based on the one or more performed analyses.

44. The method of claim 1 wherein the generating of the representative traffic flow information for the road location is based at least in part on a request received from a client, the request indicating information on which the generating of the representative traffic flow information for the road location is based that includes at least one of the road location, one or more of the multiple prior times, one or more of the time periods to which one or more of the multiple time-based categories correspond, and one or more of the multiple variable traffic-altering conditions to which one or more of the multiple condition-based categories correspond, and wherein the providing of the one or more indications of the generated representative traffic flow information for the road location includes providing the generated representative traffic flow information for the road location to the client.

45. The method of claim 1 wherein the generating of the representative traffic flow information for the road location and an aggregation classification based on aggregated prior traffic flow values includes using the aggregated traffic flow values only if the prior times for the aggregated traffic flow values are automatically determined to include sufficient temporal diversity.

46. The method of claim 45 wherein the automatic determining that the prior times for the aggregated traffic flow values include sufficient temporal diversity includes calculating a temporal statistical entropy of the aggregated traffic flow values and determining that the calculated temporal statistical entropy exceeds a minimum threshold.

47. The method of claim 1 wherein the road location includes at least one of a road link and a road segment.

48. The method of claim 1 wherein the automatic generating of the representative traffic flow information is performed for each of multiple locations on multiple roads that are part of a network of roads in the geographic area.

49. The method of claim 1 wherein the traffic flow values each correspond to speed of one or more vehicles traveling at or near the road location.

50. The method of claim 1 wherein the generated representative traffic flow information for the road location reflects predictions of future traffic flow values for the road location.

51. The method of claim 1 wherein the prior traffic flow values include traffic flow values generated by one or more road sensors for the road location and traffic flow values provided by one or more vehicles traveling on the road proximate to the road location.

52. A non-transitory computer-readable medium having stored contents that configure a computing device to generate representative traffic flow information for roads, by performing a method comprising:

selecting multiple traffic flow aggregation classifications for which representative traffic flow information will be distinctly generated for a location of a road, each aggregation classification associated with at least one of multiple time periods based on day-of-week and time-of-day information and with at least one of multiple variable traffic-altering conditions;

at each of multiple distinct times, automatically generating, by the configured computing device, representative traffic flow information for the road location by:

obtaining historical traffic flow values indicating prior traffic flow for the road location at each of multiple distinct prior times, each of at least some of the historical traffic flow values corresponding to one or more of the multiple traffic-altering conditions and to one or more of the multiple time periods;

associating the obtained historical traffic flow values with the aggregation classifications by, for each of the at least some historical traffic flow values, associating the historical traffic flow value with one of the multiple aggregation classifications that is selected based on the one aggregation classification being associated with a traffic-altering condition that matches at least one of the one or more traffic-altering conditions to which the historical traffic flow value corresponds and being associated with a time period that matches the prior time for the historical traffic flow value; and for each of one or more of the aggregation classifications, generating representative traffic flow information for traffic at the road location that occurs during the at least one traffic-altering condition associated with the aggregation classification and during the at least one time period associated with the aggregation classification, the generating of the representative traffic flow information including aggregating the traffic flow values associated with the aggregation classification and determining one or more typical traffic flow values based on the aggregated traffic flow values;

after one of the multiple distinct times and before another later of the multiple distinct times, providing at least some of the representative traffic flow information generated at the one time to one or more remote clients for use by the remote clients in facilitating travel on the road; and after the another later time, in response to a request from one of the one or more remote clients, providing updated representative traffic flow information that is generated at the another later time to the one remote client for use by the one remote client in facilitating travel on the road.

53. The non-transitory computer-readable medium of claim 52 wherein the generating of the representative traffic flow information for the road location and the providing of the generated representative traffic flow information for the road location is performed under control of a server computing system remote from the one or more remote clients, wherein the generated representative traffic flow information for the road location is provided to the one or more clients for local use by the clients in facilitating travel on the road at future times, wherein the one remote client is a client device that provides traffic-related information to one or more users of the client device, and wherein the method further comprises, after the providing of the at least some representative traffic flow information generated at the one time and under control of the client device:

for each of multiple future times, determining likely traffic flow at the future time for the road location by retrieving the provided generated representative traffic flow information for the road location from one or more local storage locations; and for another future time, determining at the another future time likely traffic flow at the another future time for the road location by dynamically interacting with the server computing system to obtain the updated representative traffic flow information.

54. The non-transitory computer-readable medium of claim 53 wherein the dynamic interacting by the one remote client device with the server computing system to obtain updated representative traffic flow information has greater costs than the retrieving of the provided generated representative traffic flow information from the one or more local storage locations, and wherein the method further comprises automatically determining for the another future time whether benefits from having the updated representative traffic flow information exceed the greater costs of obtaining that updated representative traffic flow information.

55. The non-transitory computer-readable medium of claim 52 wherein the one remote client is a client device that provides traffic-related information to one or more users of the client device, and wherein the providing of the at least some representative traffic flow information generated at the one time to the one remote client device includes storing the at least some generated representative traffic flow information on one or more non-volatile storage devices that are accessible to the one remote client device.

56. The non-transitory computer-readable medium of claim 52 wherein the generating of the representative traffic flow information for the road location and the providing of the generated representative traffic flow information for the road location is performed under control of a server computing system remote from the one or more remote clients, wherein the generated representative traffic flow information for the road location is provided to the one or more clients for local use by the clients in facilitating travel on the road at future times, wherein the one remote client is a client device that provides traffic-related information to one or more users of the client device, and wherein the method further comprises, after the providing of the at least some representative traffic flow information generated at the one time and under control of the client device:

- determining a current time and a current traffic-altering condition that affects traffic at the current time;
- selecting one of the multiple aggregation classifications based on the selected one aggregation classification being associated with a time period to which the determined current time corresponds and being associated with a traffic-altering condition to which the determined current traffic-altering condition corresponds;
- retrieving the generated representative traffic flow information for the road location that corresponds to the selected aggregation classification; and
- providing the retrieved representative traffic flow information to indicate the determined likely traffic flow for the road location at the current time.

57. The non-transitory computer-readable medium of claim 56 wherein the providing of the at least some representative traffic flow information generated at the one time to the client device includes storing the generated at least some representative traffic flow information on one or more non-volatile storage devices that are accessible to the client device.

58. The non-transitory computer-readable medium of claim 56 wherein the determining of the current traffic-altering condition that affects traffic at the current time includes dynamically interacting with the server computing system to obtain an indication of the determined current traffic-altering condition.

59. The non-transitory computer-readable medium of claim 52 wherein the generating of the representative traffic flow information for traffic at the road location for each of the multiple distinct times is performed for each of the multiple aggregation classifications.

60. The non-transitory computer-readable medium of claim 52 wherein the computer-readable medium is a memory of the configured computing device.

61. The non-transitory computer-readable medium of claim 52 wherein the contents are instructions that when executed cause the computing device to perform the method.

62. The non-transitory computer-readable medium of claim 52 wherein the contents include one or more data structures including multiple entries corresponding to generated representative traffic flow information, each of the entries corresponding to a road location and one or more traffic-altering conditions and one or more time periods so as to store one or more determined typical traffic flow values for the road location during the one or more time periods and during the one or more traffic-altering conditions.

63. A computing device configured to generate representative traffic flow information for roads, comprising:

- one or more memories; and
- a representative traffic information provider system configured to automatically provide representative traffic flow information for multiple locations on one or more roads by:
  - associating historical traffic flow values that indicate prior traffic flow for the multiple road locations at multiple prior times with multiple traffic flow aggregation classifications that represent distinct representative traffic flow information, each of at least some of the historical traffic flow values being associated with one of the road locations and corresponding to prior traffic flow at the one road location that reflects one or more of multiple traffic-altering conditions at one of the multiple prior times, each aggregation classification corresponding to at least one time period and to at least one of the multiple variable traffic-altering conditions, the associating including, for each of the at least some historical traffic flow values, associating the historical traffic flow value with at least one aggregation classification having a corresponding time period to which the prior time for the historical traffic flow value corresponds and having a corresponding traffic-altering condition that matches at least one of the one or more traffic-altering conditions reflected by the prior traffic flow to which the historical traffic flow value corresponds;
  - for each of one or more combinations of one of the multiple road locations and one of the multiple aggregation classifications, generating representative traffic flow information for traffic at the road location that occurs during the time period and reflects the one or more traffic-altering conditions corresponding to the aggregation classification, the generating including aggregating the traffic flow values associated with the aggregation classification and with the road location and determining one or more typical traffic flow values based on the aggregated traffic flow values, the generating further including generating one of more indications of reliability of at least one of the determined one or more typical traffic flow values, such that the generated representative traffic flow information for the road location and the aggregation classification includes the determined one or more typical traffic flow values and the generated one or more indications of reliability; and
  - providing one or more indications of the generated representative traffic flow information for use in facilitating travel on the one or more roads.

64. The computing device of claim 63 wherein, for each of the one or more combinations of a road location and an aggregation classification, the aggregation classification has multiple associated historical traffic flow values for a traffic flow measurement for the road location for multiple prior times, the determined one or more typical traffic flow values for the combination of the aggregation classification and the road location indicate a most likely value for the traffic flow measurement for the aggregation classification and the road location, and the one or more indications of reliability are based at least in part on a statistical analysis of the multiple historical traffic flow measurement values for the multiple prior times.

65. The computing device of claim 63 wherein, for each of the one or more combinations of a road location and an aggregation classification, the aggregation classification has multiple associated historical traffic flow values for a traffic flow measurement for the road location for multiple prior times, the determined one or more typical traffic flow values for the combination of the aggregation classification and the road location indicate an average traffic flow measurement value that is based substantially on the $50^{th}$ percentile for the multiple associated historical traffic flow values, and the one or more indications of reliability include multiple determined traffic flow measurement values for the combination of the aggregation classification and the road location other than the average value that are based substantially on multiple other percentiles for the multiple historical traffic flow measurement values for the multiple prior times.

66. The computing device of claim 65 wherein the representative traffic information provider system is further configured to, before the generating of the representative traffic flow information for the one or more combinations, receive a request that specifies the multiple other percentiles, and wherein the determining of the multiple traffic flow measurement values based substantially on the multiple other percentiles is based on the request.

67. The computing device of claim 63 wherein, for each of the one or more combinations of a road location and an aggregation classification, the aggregation classification has multiple associated historical traffic flow values for a traffic flow measurement for the road location for multiple prior times, the determined one or more typical traffic flow values for the combination of the aggregation classification and the road location indicate a median traffic flow measurement value based on the multiple associated historical traffic flow values, and the one or more indications of reliability include multiple deviation indications that each indicate a likelihood that an actual value for the traffic flow measurement for the road location at a future time that corresponds to the aggregation classification will deviate from a median traffic flow measurement value by at least a specified amount.

68. The computing device of claim 67 wherein the representative traffic information provider system is further configured to, before the generating of the representative traffic flow information for the one or more combinations, receive a request that specifies one or more amounts of deviation from a median value and/or one or more degrees of likelihood, and wherein the generating of the multiple deviation indications is based on the request.

69. The computing device of claim 63 wherein the generated one or more indications of reliability of at least one of the determined typical traffic flow values for a combination of a road location and an aggregation classification are for use by a client in determining a route that includes the road location and that is stable when traffic flow conditions vary from average traffic flow conditions for the aggregation classification.

70. The computing device of claim 63 wherein the generated one or more indications of reliability of at least one of the determined typical traffic flow values for a combination of a road location and an aggregation classification are for use by a client in determining a route that includes the road location and that is a fastest route in an indicated situation in which traffic flow conditions differ from average traffic flow conditions for the aggregation classification.

71. The computing device of claim 63 wherein the representative traffic information provider system includes software instructions for execution by the computing device.

72. The computing device of claim 63 wherein the representative traffic information provider system consists of a means for automatically providing representative traffic flow information for multiple locations on one or more roads by:

associating historical traffic flow values that indicate prior traffic flow for the multiple road locations at multiple prior times with multiple traffic flow aggregation classifications that represent distinct representative traffic flow information, each of at least some of the historical traffic flow values being associated with one of the road locations and corresponding to prior traffic flow at the one road location that reflects one or more of multiple traffic-altering conditions at one of the multiple prior times, each aggregation classification corresponding to at least one time period and to at least one of the multiple variable traffic-altering conditions, the associating including, for each of the at least some historical traffic flow values, associating the historical traffic flow value with at least one aggregation classification having a corresponding time period to which the prior time for the historical traffic flow value corresponds and having a corresponding traffic-altering condition that matches at least one of the one or more traffic-altering conditions reflected by the prior traffic flow to which the historical traffic flow value corresponds;

for each of one or more combinations of one of the multiple road locations and one of the multiple aggregation classifications, generating representative traffic flow information for traffic at the road location that occurs during the time period and reflects the one or more traffic-altering conditions corresponding to the aggregation classification, the generating including aggregating the traffic flow values associated with the aggregation classification and with the road location and determining one or more typical traffic flow values based on the aggregated traffic flow values, the generating further including generating one of more indications of reliability of at least one of the determined one or more typical traffic flow values, such that the generated representative traffic flow information for the road location and the aggregation classification includes the determined one or more typical traffic flow values and the generated one or more indications of reliability; and providing one or more indications of the generated representative traffic flow information for use in facilitating travel on the one or more roads.

* * * * *

UNITED STATES PATENT AND TRADEMARK OFFICE

CERTIFICATE OF CORRECTION

PATENT NO. : 8,700,294 B2
APPLICATION NO. : 12/377592
DATED : April 15, 2014
INVENTOR(S) : Oliver B. Downs et al.

It is certified that error appears in the above-identified patent and that said Letters Patent is hereby corrected as shown below:

On the Title Page, Item (56):

"“Global Positioning Systems > Tracking Systems in the Yahoo! Directory,” Yahoo!® Small Business Directory, retrieved February 8, 2006, from http://dir.yahoo.com/Business_and_Economy/Busi-ness_to_Business/Navigation/Global_Positioning_Systems/Tracking_Systems, 8 pages.” should read, --“Global Positioning Systems > Tracking Systems in the Yahoo! Directory,” Yahoo!® Small Business Directory, retrieved February 8, 2006, from http://dir.yahoo.com/Business_and_Economy/Business_to_Business/Navigation/Global_Positioning_Systems/Tracking_Systems, 8 pages.--.

"“Powerful Tool Crunches Commutes,” March 8, 2005, National Science Foundation, retrieved January 20, 2006, from http://www.beat-thetraffic.com/aboutus/nsf20050308.htm, 2 pages.” should read, --“Powerful Tool Crunches Commutes,” March 8, 2005, National Science Foundation, retrieved January 20, 2006, from http://www.beatthetraffic.com/aboutus/nsf20050308.htm, 2 pages.--.

Signed and Sealed this
Twenty-third Day of September, 2014

Michelle K. Lee

Michelle K. Lee
*Deputy Director of the United States Patent and Trademark Office*